United States Patent
Watson et al.

(10) Patent No.: US 7,423,407 B2
(45) Date of Patent: *Sep. 9, 2008

(54) CORDLESS POWER TOOL SYSTEM HAVING SLIDABLY-ENGAGING POWER SOURCE CONNECTION

(75) Inventors: James B. Watson, Fallston, MD (US); Paul S. White, Ellicott City, MD (US); Christopher R. Yahnker, Eldersburg, MD (US); Daniel Puzio, Baltimore, MD (US); Thomas J. Bodine, Jessup, MD (US); Robert Bradus, Bel Air, MD (US); Daniele C. Brotto, Baltimore, MD (US); John E. Buck, Cockeysville, MD (US); Daniel J. White, Baltimore, MD (US); Samuel G. Woods, Bel Air, MD (US); Richard T. Walter, Baldwin, MD (US); Edward A. Harrison, Bel Air, MD (US); Adan Ayala, Owings Mills, MD (US)

(73) Assignee: Black & Decker Inc., Newark, DE (US)

( * ) Notice: Subject to any disclaimer, the term of this patent is extended or adjusted under 35 U.S.C. 154(b) by 63 days.

This patent is subject to a terminal disclaimer.

(21) Appl. No.: 11/330,279

(22) Filed: Jan. 11, 2006

(65) Prior Publication Data

US 2006/0108981 A1 May 25, 2006

Related U.S. Application Data

(63) Continuation of application No. 10/624,179, filed on Jul. 22, 2003, now Pat. No. 7,005,831, which is a continuation of application No. 10/309,840, filed on Dec. 4, 2002, now Pat. No. 6,653,815, which is a continuation of application No. 09/963,809, filed on Sep. 26, 2001, now Pat. No. 6,515,451, which is a continuation of application No. 09/732,145, filed on Dec. 7, 2000, now Pat. No. 6,304,058, which is a continuation-in-part of application No. 09/579,940, filed on May 26, 2000, now Pat. No. 6,329,788, which is a continuation of application No. 09/133,923, filed on Aug. 13, 1998, now Pat. No. 6,996,909, which is a continuation-in-part of application No. 09/133,924, filed on Aug. 13, 1998, now Pat. No. 6,057,608.

(51) Int. Cl.
*H01M 10/46* (2006.01)
(52) U.S. Cl. ...................................... 320/114
(58) Field of Classification Search .............. 320/106, 320/110, 112, 114, 115
See application file for complete search history.

(56) References Cited

U.S. PATENT DOCUMENTS 2,962,062 A 11/1960 Winkler et al.

(Continued)

FOREIGN PATENT DOCUMENTS

DE 39 19 702 11/1991

(Continued)

OTHER PUBLICATIONS

1997 DeWalt Catalog, p. 18.

(Continued)

*Primary Examiner*—Edward Tso
(74) *Attorney, Agent, or Firm*—Harness, Dickey & Pierce, P.L.C.

(57) ABSTRACT

A system of cordless power tools includes a cordless power tool adapted to removably receive a rechargeable battery pack. The battery pack and the power tool can have complementary grooves and rails or L-shaped surfaces that aid in aligning the positive and negative blade terminals of the battery pack to the positive and negative tool terminals, respectively, of the power tool.

19 Claims, 14 Drawing Sheets

U.S. PATENT DOCUMENTS

| | | | |
|---|---|---|---|
| 3,262,472 A | 7/1966 | McCarty et al. | |
| 3,292,673 A | 12/1966 | Gregory | |
| 3,447,577 A | 6/1969 | Burrows et al. | |
| 3,706,332 A | 12/1972 | George | |
| 3,730,239 A | 5/1973 | Kaman et al. | |
| 3,734,207 A * | 5/1973 | Fishbein | 173/217 |
| 3,757,194 A | 9/1973 | Weber et al. | |
| 3,883,789 A | 5/1975 | Achenbach et al. | |
| 3,338,394 A | 6/1975 | Kaye | |
| 3,952,239 A | 4/1976 | Owings et al. | |
| 3,973,179 A | 8/1976 | Weber et al. | |
| 4,221,051 A | 9/1980 | Glass | |
| 4,321,523 A | 3/1982 | Hammel | |
| 4,353,165 A | 10/1982 | Albery | |
| 4,516,324 A | 5/1985 | Heininger, Jr. et al. | |
| 4,555,849 A | 12/1985 | Ando et al. | |
| 4,616,169 A | 10/1986 | Proffitt | |
| 4,847,513 A | 7/1989 | Katz et al. | |
| 4,856,394 A | 8/1989 | Clowers | |
| 4,982,501 A | 1/1991 | Sauerwein et al. | |
| 5,010,651 A | 4/1991 | Techter et al. | |
| 5,140,249 A | 8/1992 | Linder et al. | |
| 5,207,697 A * | 5/1993 | Carusillo et al. | 606/167 |
| 5,208,525 A | 5/1993 | Lopic et al. | |
| 5,381,602 A | 1/1995 | Matzo et al. | |
| 5,391,972 A | 2/1995 | Gardner et al. | |
| D363,656 S | 10/1995 | Gierke | |
| 5,454,167 A | 10/1995 | Albery | |
| 5,504,412 A | 4/1996 | Chan et al. | |
| 5,508,123 A | 4/1996 | Fan | |
| 5,517,763 A | 5/1996 | Schilling et al. | |
| 5,553,675 A | 9/1996 | Pitzen et al. | |
| 5,589,288 A | 12/1996 | Coulson et al. | |
| 5,671,815 A | 9/1997 | Kabatnik et al. | |
| 5,792,573 A | 8/1998 | Pitzen et al. | |
| 5,881,823 A | 3/1999 | Kabatnik et al. | |
| 6,075,341 A | 6/2000 | White et al. | |
| 6,175,211 B1 * | 1/2001 | Brotto | 320/106 |

FOREIGN PATENT DOCUMENTS

| | | |
|---|---|---|
| DE | 44 03 189 | 11/1991 |
| DE | G 91 15 492. 8 | 4/1992 |
| DE | 93 11 901.1 | 8/1993 |
| DE | 93 19 361.0 | 12/1993 |
| DE | G 93 19 361.0 | 3/1994 |
| DE | 196 04 346 A1 | 8/1996 |
| DE | 34 29 095 | 1/1997 |
| DE | 295 13 330 | 2/1997 |
| EP | 0 238 718 | 11/1986 |
| EP | 0 374 600 B1 | 8/1995 |
| EP | 1 017 149 A2 | 7/2000 |
| EP | 1 025 961 A1 | 8/2000 |
| EP | 1 017 149 A3 | 4/2001 |
| GB | 2 302 051 | 1/1997 |
| JP | 0281880 | 11/1989 |

OTHER PUBLICATIONS

Makita 1997 Pocket Catalog, pp. 11, 16.
Milwaukee Heavy Duty Electric Tools For Contractors and Industry, 1997 Catalog, p. 24.
Makita 1993 Catalog, four pages including cover page, pp. 17 and 19, and back page (dated 1993).

* cited by examiner

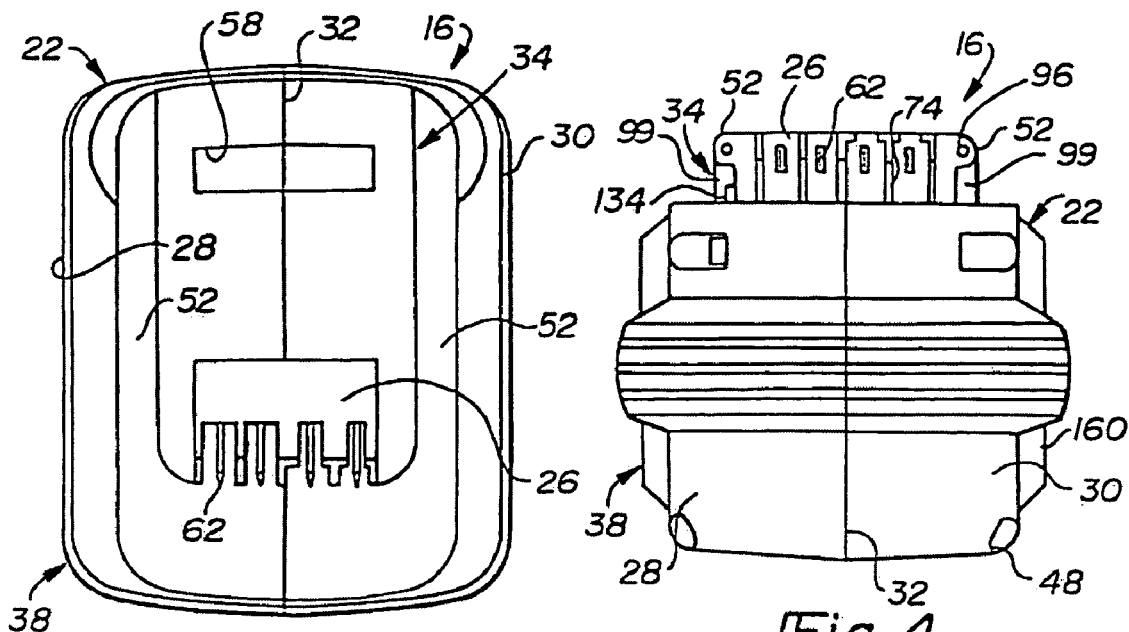
Fig-3
Fig-4
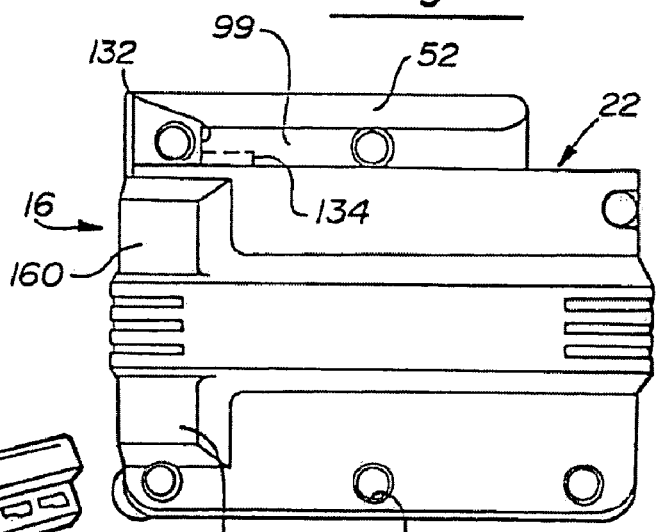
Fig-5
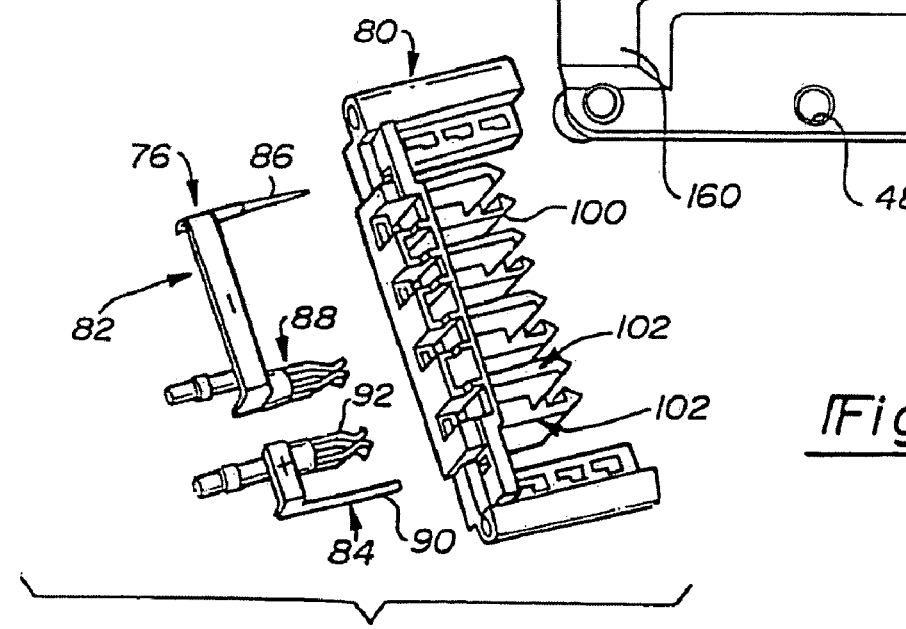
Fig-6A

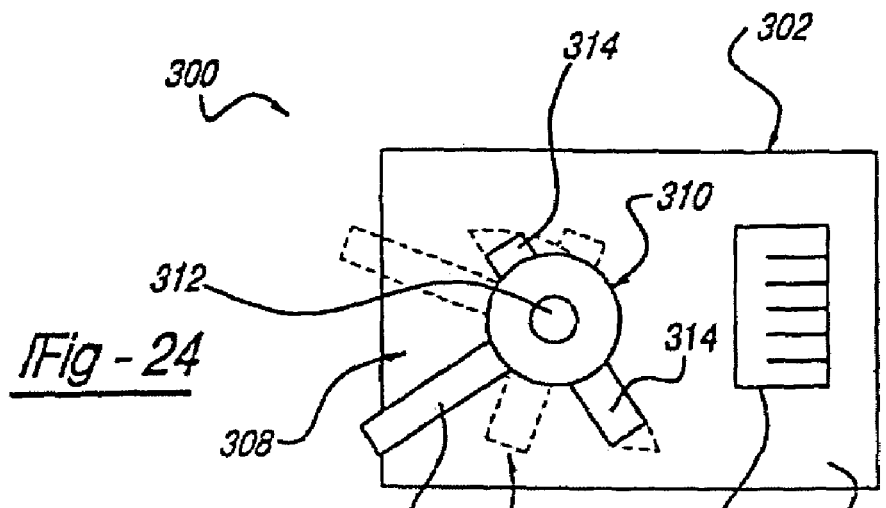
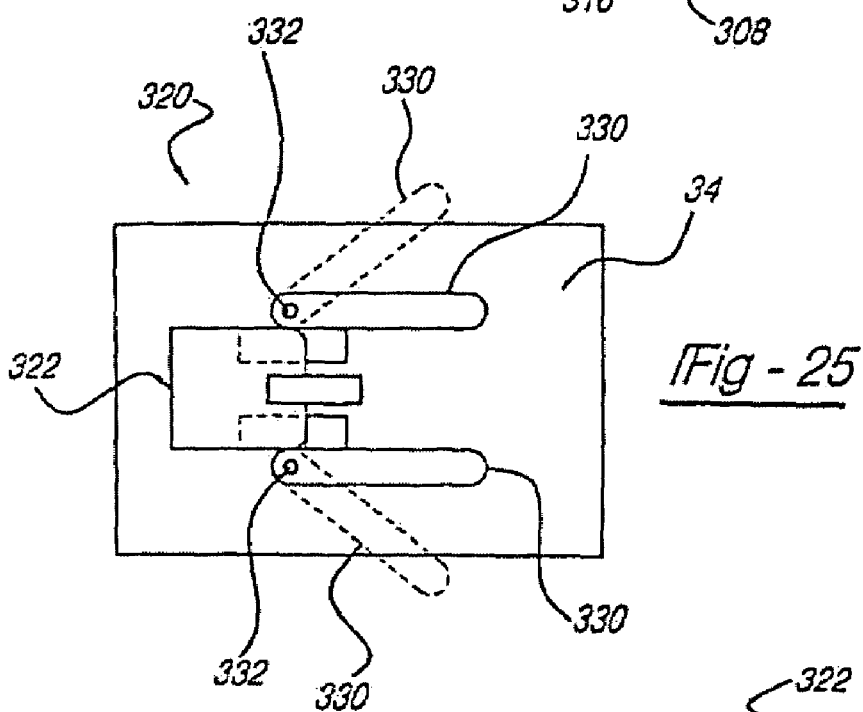
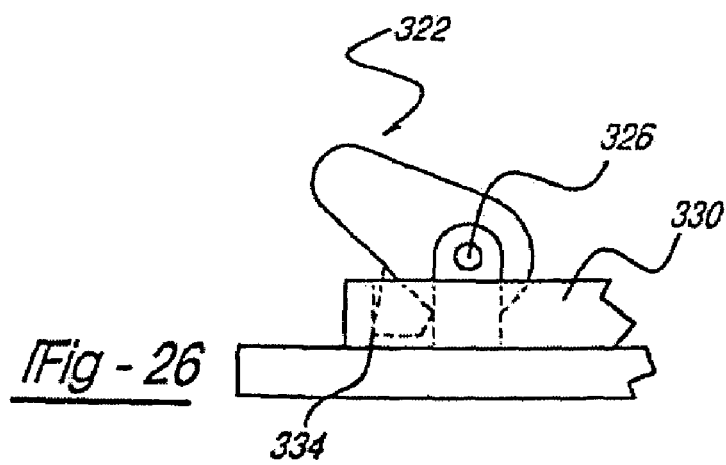

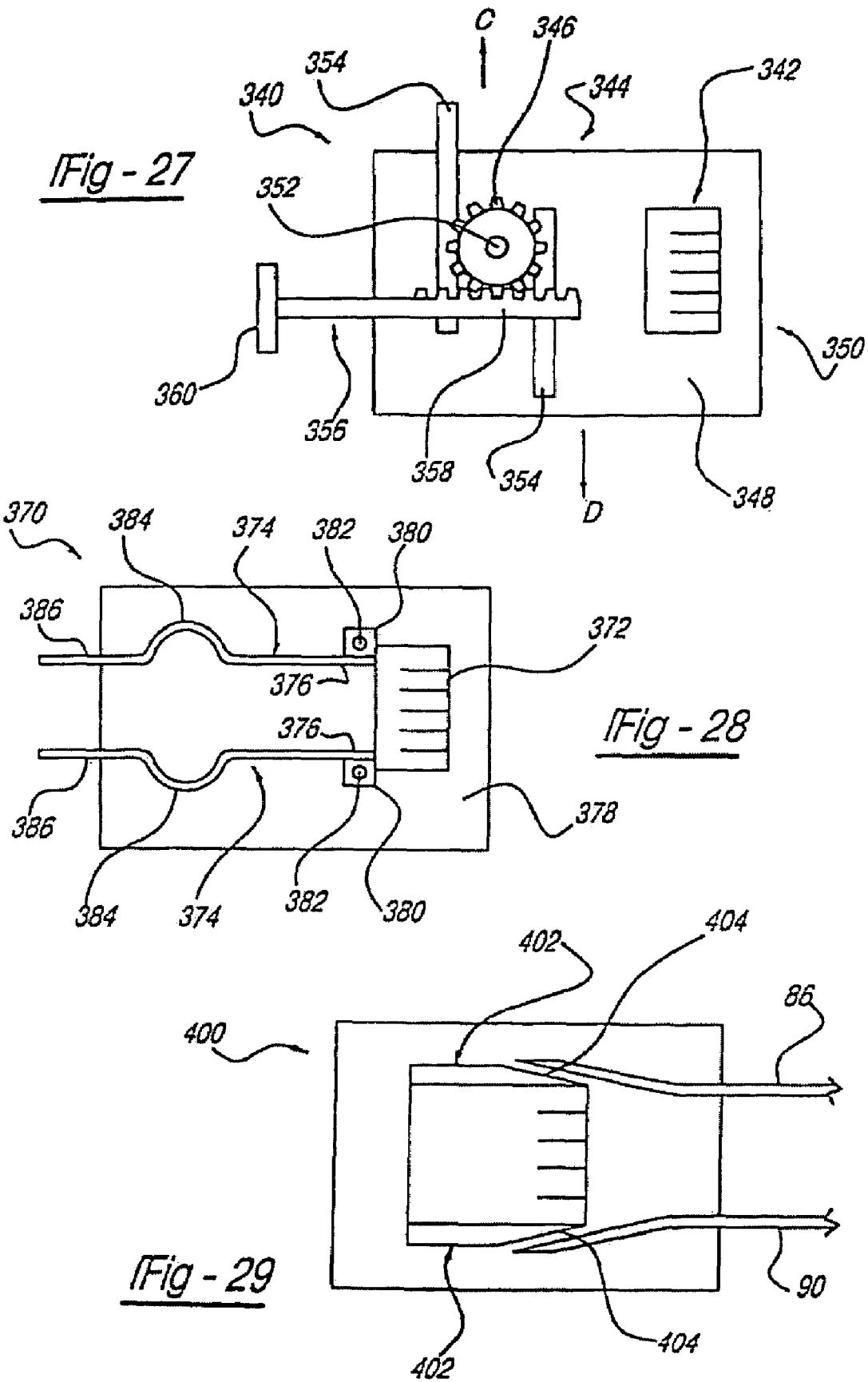

CORDLESS POWER TOOL SYSTEM HAVING SLIDABLY-ENGAGING POWER SOURCE CONNECTION

CROSS-REFERENCE TO RELATED APPLICATIONS

This application is a continuation of U.S. patent application Ser. No. 10/624,179 filed Jul. 22, 2003 now U.S. Pat. No. 7,005,831, which is a continuation of U.S. patent application Ser. No. 10/309,840, filed Dec. 4, 2002 (issued as U.S. Pat. No. 6,653,815), which is a continuation of U.S. patent application Ser. No. 09/963,809, filed Sep. 26, 2001 (issued as U.S. Pat. No. 6,515,451), which is a continuation of U.S. Ser. No. 09/732,145, filed Dec. 7, 2000 (issued as U.S. Pat. No. 6,304,058), which is a continuation-in-part of U.S. Ser. No. 09/579,940, filed May 26, 2000 (issued as U.S. Pat. No. 6,329,788), which is a continuation of U.S. Ser. No. 09/133,923, filed Aug. 13, 1998 now U.S. Pat. No. 6,996,909, which is a continuation-in-part of U.S. Ser. No. 09/133,924, filed Aug. 13, 1998 (issued as U.S. Pat. No. 6,057,608).

TECHNICAL FIELD

The present disclosure generally pertains to power tools. More particularly, the present disclosure pertains to a system of cordless power tools. More specifically, but without restriction to the particular embodiment and/or use which is shown and described for purposes of illustration, the present disclosure relates to a system of cordless power tools with an improved battery pack interface.

BACKGROUND

Cordless power tools including interchangeable battery units are widely known in the prior art. For example, one such system is shown and described in commonly assigned U.S. Pat. No. 3,952,239. U.S. Pat. No. 3,952,239 discloses a system of tools utilizing individual tool heads, each of which incorporates its own essential elements such as a motor and a blade or chuck. This type of system reduces space requirements for tool storage and increases the life span for each motor. Another significant aspect of systems such as that disclosed by U.S. Pat. No. 3,952,239 is the fact that they permit improved utilization of incorporated nickel-Black cadmium batteries and an associated battery charger which are particularly high cost elements of the system.

While prior art systems, including but not limited to the type disclosed in U.S. Pat. No. 3,952,239, have proven to be suitable for many intended uses, they are all associated with certain disadvantages and/or limitations. Accordingly, it is a general object of the present invention to provide an improved system of cordless power tools.

SUMMARY

In one form, the present disclosure provides a system of cordless power tools that includes a cordless power tool and a battery pack. The cordless power tool has a housing with a motor housing portion, a handle and a battery connection portion. The handle has a first end, which is coupled to the motor housing portion, and a second end that is coupled to the battery connection portion. The battery connection portion has a pair of tool guide grooves, a pair of tool guide rails, and a plurality of tool terminals. The battery pack has a pair of battery guide rails, a pair of battery guide grooves, and a plurality of battery terminals. The battery pack engages the battery connection portion such that the battery guide rails are received in the tool guide grooves and the tool guide rails are received in the battery guide grooves. One of the tool terminals and the battery terminals is a male blade terminal and the other one of the tool terminals and the battery terminals is a female terminal that receives an associated one of the male blade terminals when the battery pack is fixedly but releasably coupled to the battery connection portion.

In another form, the present disclosure provides a system of cordless power tools that includes a cordless power tool and a battery pack. The cordless power tool has a tool housing with a motor housing portion, a handle and a battery connection portion. The handle has a first end, which is coupled to the motor housing portion, and a second end that is coupled to the battery connection portion. The battery connection portion has a pair of first sidewalls and a plurality of tool terminals that are disposed between the first sidewalls. Each of the first sidewalls has an L-shaped interior surface. The battery pack has a battery housing and a plurality of battery terminals. The battery housing has a pair of second sidewalls that are each slidably engaging an associated one of the first sidewalls when the battery pack is inserted to the battery connection portion in an insertion direction. The first and second sidewalls cooperate to limit movement of the battery pack relative to the battery connection portion in two directions that are perpendicular to the insertion direction. One of the tool terminals and the battery terminals is a male blade terminal and the other one of the tool terminals and the battery terminals is a female terminal that receives an associated one of the male blade terminals when the battery pack is fixedly but releasably coupled to the battery connection portion.

In still another form, the present disclosure provides a method that includes: providing a power tool having a tool housing, the tool housing including a handle and a battery connection portion that is directly coupled to an end of the handle, the battery connection portion having a pair of first sidewalls and a plurality of first terminals, each of the first sidewalls having an L-shaped interior surface; providing a rechargeable battery pack having a battery housing and a plurality of second terminals, the battery housing including a pair of second sidewalls, each of the second sidewalls having a portion that is generally L-shaped; grossly aligning the first and second terminals by engaging the second sidewalls to the first sidewalls and sliding the battery pack relative to the power tool by a predetermined first distance; and precisely aligning the first and second terminals by sliding the battery pack relative to the power tool by an additional predetermined second distance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 3 is a top view of the battery pack of FIG. 2;

FIG. 4 is a front view of the battery pack of FIG. 2;

FIG. 5 is a right side view of the battery pack of FIG. 2;

FIG. 6A is an enlarged and exploded perspective view of a tool terminal block carried by the cordless power tool of FIGS. 1A-1C;

FIG. 24 is a top view of a battery pack of a seventh alternative embodiment of the present invention;

FIG. 25 is a top view of a battery pack of a eighth alternative embodiment of the present invention;

FIG. 26 is a side view of the portion of the battery pack of FIG. 25;

FIG. 27 is a top view of a battery pack of a ninth alternative embodiment of the present invention;

FIG. 28 is a top view of a battery pack of a tenth alternative embodiment of the present invention;

FIG. 29 is a top view of a battery pack of a eleventh alternative embodiment of the present invention.

DETAILED DESCRIPTION

Figure 1A:
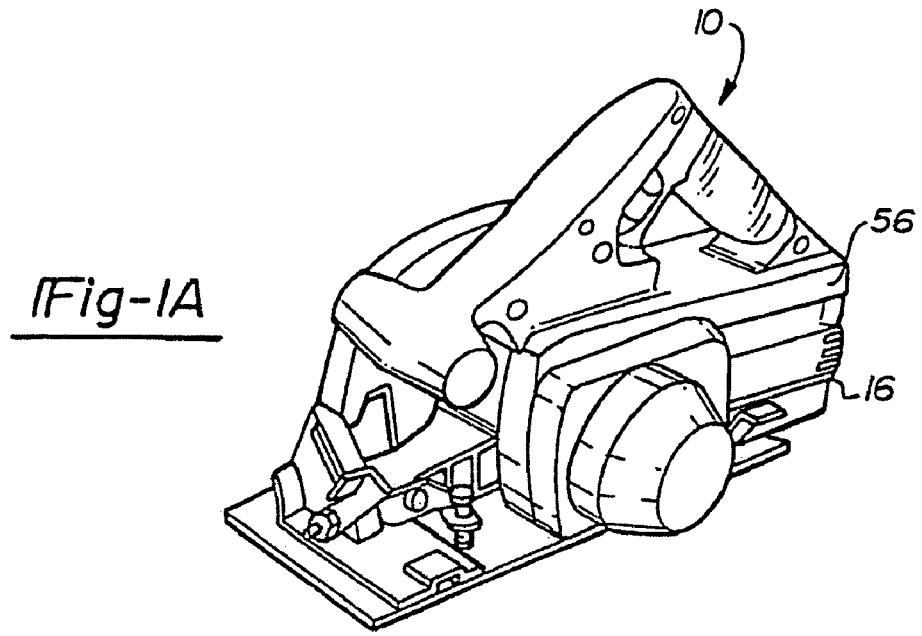
FIGS. 1A-1C are illustrations of a first cordless power tool of a cordless power tool system constructed in accordance with the teachings of a first preferred embodiment of the present invention.
Figure 1B:
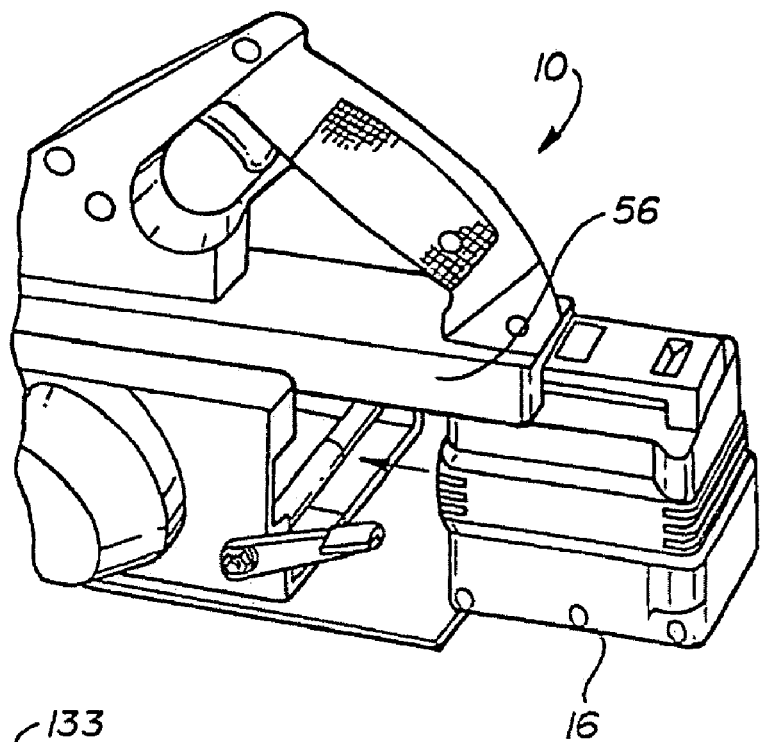
Figure 1C:
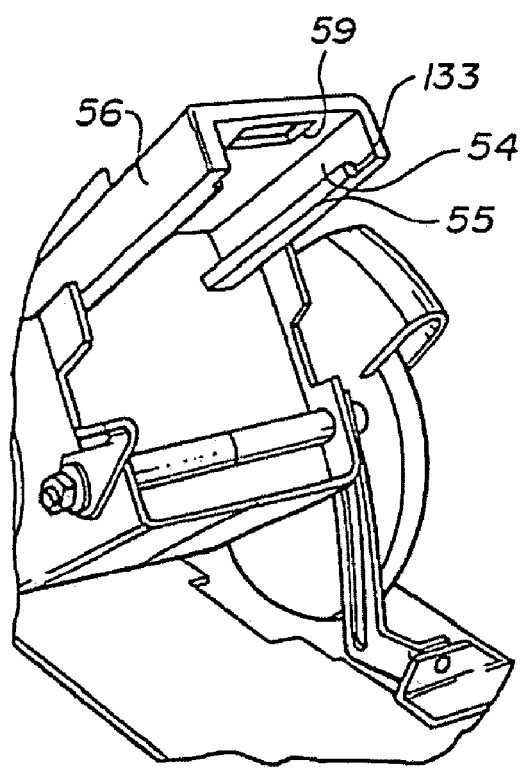
Figure 15:
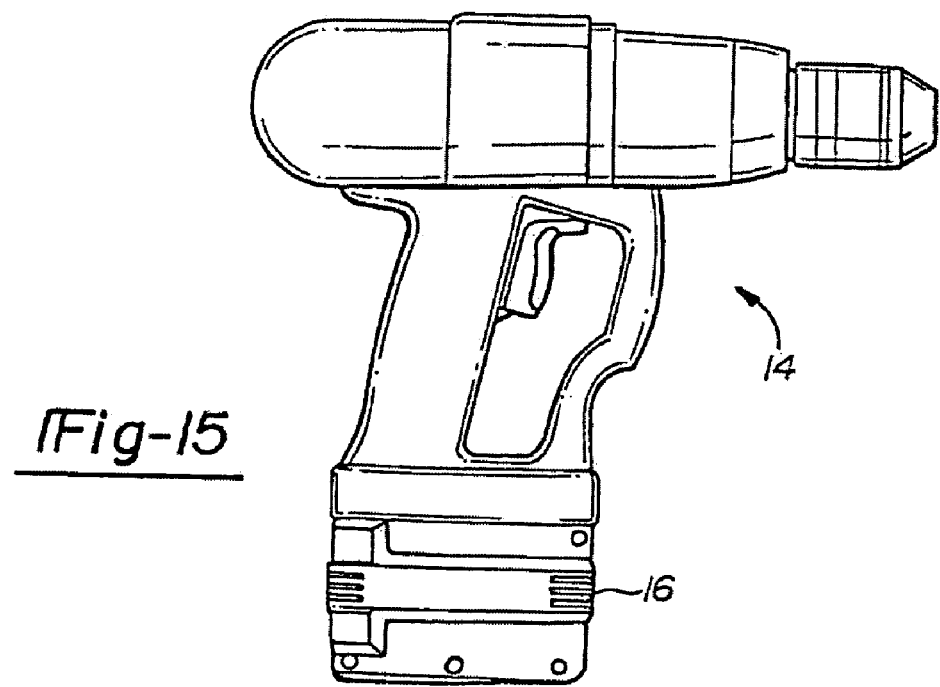
FIG. 15 is a side view of a third cordless power tool of the system of the present invention.

With general reference to the drawings, a system of cordless power tools constructed in accordance with the teachings of a preferred embodiment of the present invention is illustrated. Exemplary cordless power tools of the system are shown to include, by way of examples, a circular power saw 10 (FIG. 1), a reciprocating saw 12 (FIG. 13), and a drill 14 (FIG. 15). The tools 10-14 each include a conventional DC motor (not shown) adapted to be powered with a common voltage. In the exemplary embodiment, the tools 10-14 are intended to be driven by a 24 volt power source. It will become evident to those skilled that the present invention is not limited to the particular types of tools shown in the drawings nor to specific voltages. In this regard, the teachings of the present invention are applicable to virtually any type of power tool and any supply voltage.

With continued reference to the drawings, the system of the present invention is additionally shown to generally include a first battery pack 16. In the exemplary embodiment illustrated, the battery pack is a rechargeable battery pack 16. Alternatively, it will be understood that in certain applications the battery pack 16 is a disposable battery.

Figure 11:
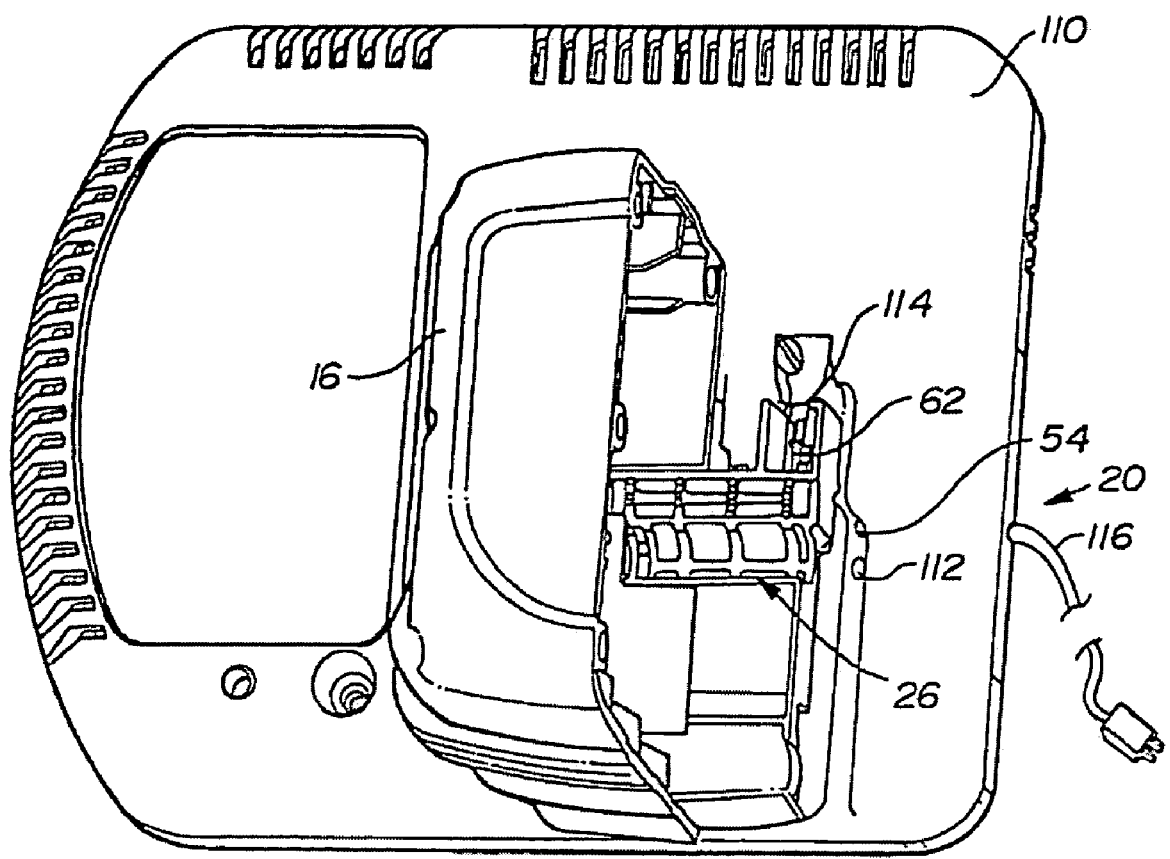
FIG. 11 is a partially exploded and partially cutaway view illustrating a battery pack charger of the system of the present invention shown operatively associated with the first battery pack.
Figure 13:
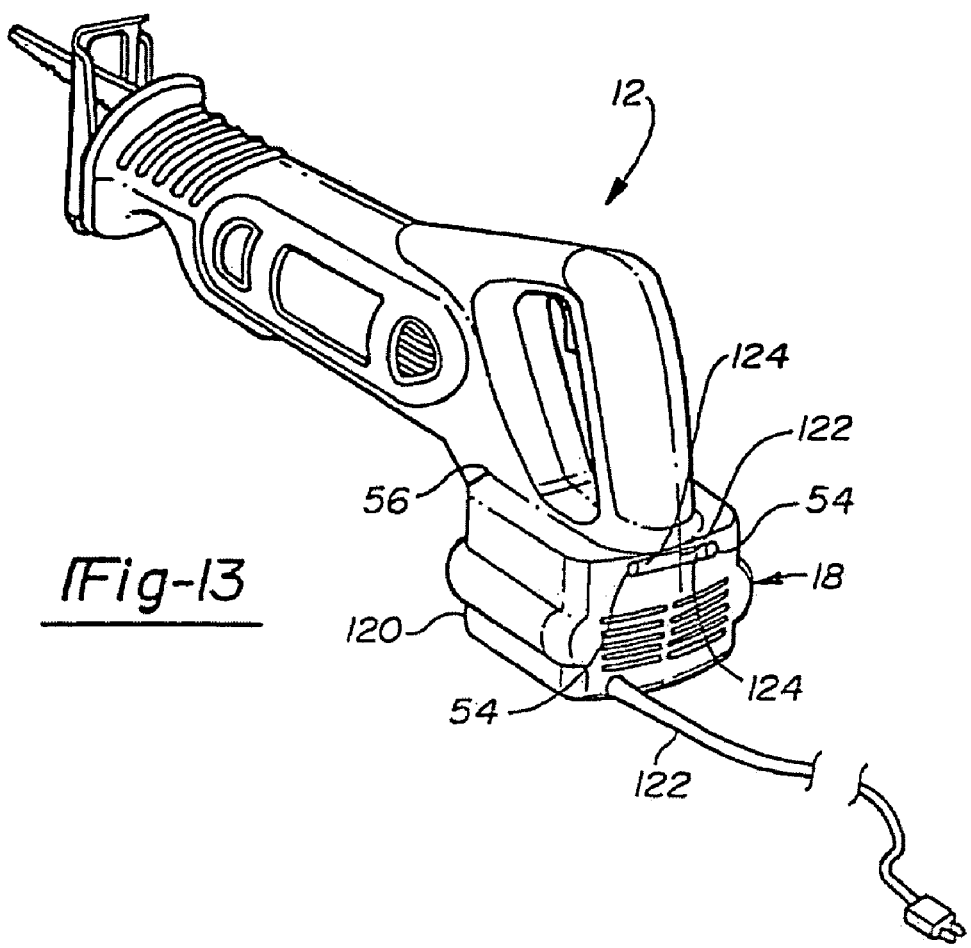
FIG. 13 is a perspective view of a second cordless power tool of the system of the present invention shown operatively associated with a converter.

The system 10 of the present invention is further shown to generally include an AC/DC converter 18 and a battery charger 20 for charging the battery pack 16. The battery charger 20 is shown in FIG. 11 partially cut-away and operatively associated with the battery pack 16. The AC/DC converter is shown in FIG. 13 removably attached to the reciprocating saw 12. As used herein, the term power source shall include rechargeable and disposable battery packs and an AC/DC converter.

The focus of the present invention most particularly pertains to the interfaces between the tools 10-14 and the battery pack 16, the interfaces between tools 10-14 and the AC/DC converter 18, and the interfaces between the battery pack 16 and the battery charger 20. During the remainder of this detailed description, it will be understood that the tool interface of each of the tools 10-14 is substantially identical.

With particular reference to FIGS. 2-6, the rechargeable battery pack 16 of the present invention is illustrated to generally include a housing 22, a battery 24 which in the exemplary embodiment illustrated is a 24 volt nickel-cadmium battery, and a battery pack terminal block 26. The housing 22 is shown to include first and second clam shell halves 28 and 30 which are joined at a longitudinally extending parting line 32. Alternatively, it will be understood that the housing 22 may include a pair of halves joined at a laterally extending parting line, or various other constructions including two or more housing portions.

The first and second clam shell halves 28 and 30 of the housing 22 cooperate to form an upper portion 34 defining a first chamber 36 and a lower portion 38 defining a second chamber 40. The first chamber 36 receives the battery pack terminal block 26, while the second chamber 40 receives the battery 24. The battery pack terminal block 26 is fixed against lateral and longitudinal movement relative to the housing 22 except for minimal part tolerance stack up. In one application, the battery pack housing 22 has an overall length of approximately 11.5 cm, an overall width of approximately 9.5 cm, and an overall height of approximately 9.5 cm.

In the exemplary embodiment, the first and second clam shell halves 28 and 30 of the housing 22 are each unitarily constructed from a rigid plastic or other suitable material. The first and second clam shell haves 28 and 30 are joined by thread-forming fasteners 42. The thread-forming fasteners 42 pass through cooperating apertures 44 and screw boss portions 46 integrally formed with the clam shell halves 28 and 30. Upon assembly, the fasteners 42 form threads in screw boss portions 46 of housing 30. In the exemplary embodiment illustrated, the first clam shell half 28 of the housing 22 is formed to include a peripheral groove 50 adapted to receive a mating rib (not specifically shown) peripherally extending about the second clam shell half 30.

To facilitate releasable attachment of the battery pack 16 to the tool 10, the upper portion 34 of the housing 22 is formed to include a pair of guide rails 52. The guide rails 52, which will be described further below, are slidably received into cooperating grooves 54 defined by rails 55 formed in a housing 56 of the tool 10. To further facilitate removable attachment of the battery pack 16 to the tool 10, the upper portion 34 of the housing 22 defines a recess 58. The recess 58 is adapted to receive one or more latch 59 carried by the housing 56 of the tool 10. The latch 59 is conventional in construction and operation and is spring biased to a downward position so as to engage the recess 58 upon insertion with the rechargeable battery pack 16. Removal of the battery pack 16 is thereby prevented until the spring bias of the latch 59 is overcome in a conventional manner insofar as the present invention is concerned.

Figure 7:
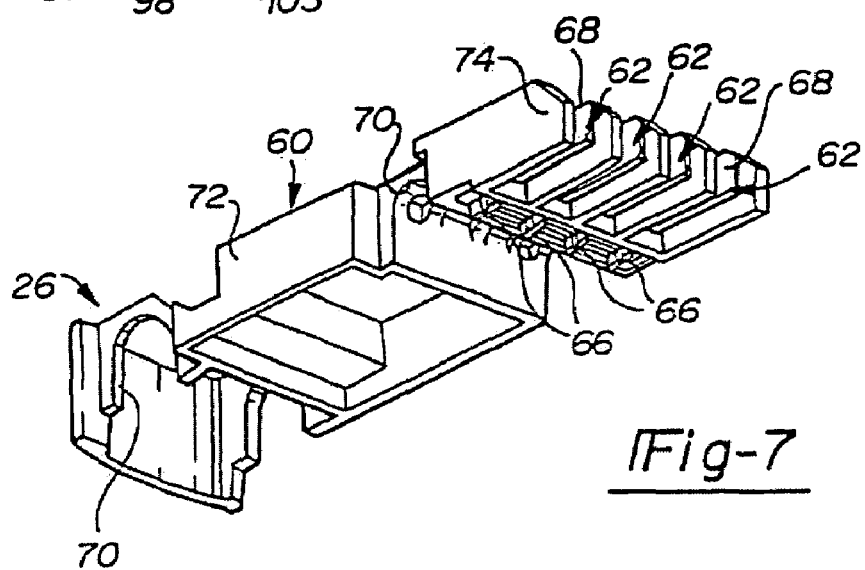
FIG. 7 is a perspective view of the battery pack terminal block of FIG. 2.
Figure 8:
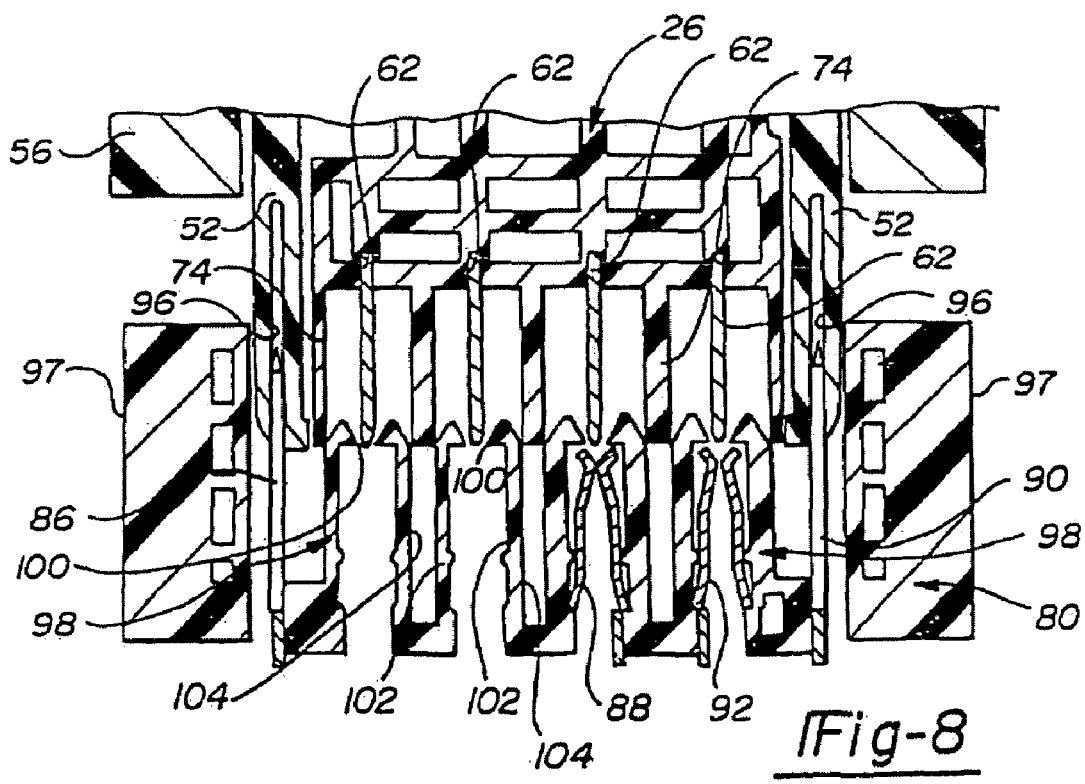
FIG. 8 is a cross-sectional view illustrating the interface between the battery pack and tool.

With continued reference to FIGS. 2-5 and additional reference to FIGS. 7 and 8, the battery pack terminal block 26 is illustrated to generally include a main body portion 60 constructed of rigid plastic or other suitable material and a plurality of terminals 62. The terminals 62 are generally planar-shaped blade terminals each oriented in a plane substantially perpendicular to a floor 64 (shown in FIG. 2) partially defining the upper chamber 36 of the housing 22. Each blade terminal 62 includes a first end 66 which downwardly extends from the main body portion 60. The blade terminals 62 each further include a second end 68 which forwardly extends. In the preferred embodiment, the second ends 68 of the blade terminals 62 are upwardly spaced from the floor 64. As will be appreciated more fully below, such spacing of the blade terminal 62 from the floor 64 provides improved clearance around the blade terminals 62 and reduces the risk of contamination of the terminals 62 with dirt and other debris. In addition, such spacing of the terminals 62 from the floor 64 allows the contacts of the charger 20 to be more fully enclosed by insulating material. This aspect of the present invention will be discussed further below. Further in the preferred embodiment, the front tips of the blade terminals 62 and the guide rails 52 are transversely aligned.

The main body 60 of the terminal block 26 is shown captured between the clam shell halves 28 and 30 of the housing 22. This arrangement improves assembly by allowing the terminal block 26 to first be electrically attached to the battery 24 and subsequently captured between the clam shell halves 28 and 30. The main body 60 is shown to include a pair of arcuate grooves 70 provided in an under surface thereof for accommodating the screw boss portions 46 of the housing 20 upon assembly. Similarly, an upper side of the main body 60 includes a recess 72 for accommodating the recess 58 of the housing 22. The main body portion 60 is further shown to include a plurality of insulating portions 74 that are positioned outboard of each of the outermost end blade terminals 62 as well as disposed between adjacent blade terminals 62. The insulating portions 74 protect the blade terminals 62 from incidental contact or damage.

In the exemplary embodiment illustrated, the battery pack terminal block 26 includes four blade terminals 62. Two of the blade terminals 62 are the positive and negative terminals for the battery 24. A third terminal 62 may be used to monitor temperature of the battery 24 and a fourth terminal may be used for battery identification. The particular functions of the third and fourth blade terminals 62 are beyond the scope of the present invention and need not be described in detail herein. It will be appreciated by those skilled in the art that additional terminals 62 may be employed within the scope of the present invention.

Figure 6B:
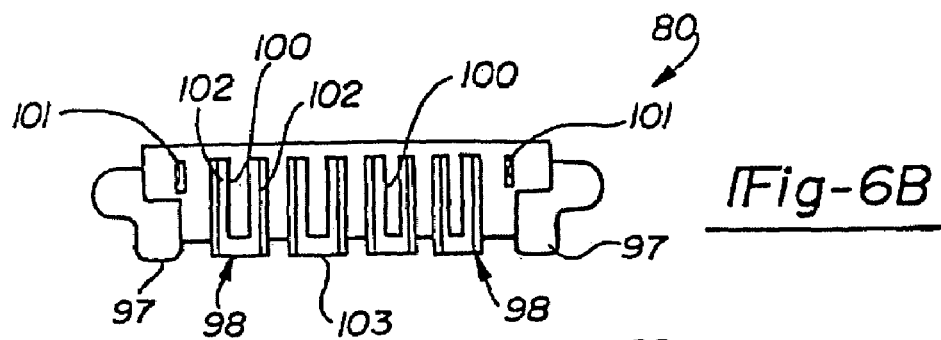
FIG. 6B is an end view of the main body portion of the tool terminal block.

With particular reference now to FIGS. 6A-B and 8, a terminal block 76 carried by the tool 10 will be described. The tool terminal block 76 is attached to the housing 56 so as to prevent lateral movement relative to the housing except for part tolerance stack up. In the exemplary embodiment illustrated, the tool terminal block 76 is attached to the housing 56 so as to also prevent longitudinal movement. However, as discussed below, certain applications may desire limited longitudinal translation of the tool terminal block 76.

The tool terminal block 76 is illustrated to generally include a main body portion 80, a first or negative terminal member 82, and a second or positive terminal member 84. The first terminal member 82 includes a negative male terminal 86 and a negative female terminal 88. Similarly, the second terminal member includes a positive male terminal 90 and a positive female terminal 92. As will be further discussed below, the female terminals 88 and 92 are adapted to receive the positive and negative blade terminals 62 of the battery pack terminal block 26. The male terminals 86 and 90 are adapted to electrically attach the tool 10 to the converter 18. As shown in FIG. 8, when the battery pack 16 is operatively attached to the tool 10, the male terminals 86 and 90 of the tool terminal block 76 are received within clearances, shown in the exemplary embodiment as apertures 96, provided in each of the rails 52. Alternatively, the clearances 96 to accommodate the male terminals 86 and 90 may be in the form of grooves provided in the rails 52 or the rails may be reduced in length.

In applications where the battery pack 16 is disposable, the male terminals 86 and 90 may be cut off. In such applications, the rails 52 need not be configured to accommodate the male terminals 86 and 90. It will be understood that the male terminals 86 and 90 serve no electrical function when the battery pack 16 is attached to the tool 10.

In one particular aspect of the present invention, a method of using a cordless power tool includes a first general step of providing a cordless power tool having a housing 22. The housing 22 preferably defines a pair of lateral grooves 54. The tool includes a first tool terminal block 76 having a pair of male terminals 86 and 90 and a pair of female terminals 88 and 92. As discussed above, the male terminals 86 and 90 are intended to electrically couple to a converter 18. In a second general step, the method of the present invention includes cutting off at least one of the male terminals 86 and 90. In this manner, the tool may accommodate a rechargeable battery pack without the necessary clearances for the male terminals 86 and 90.

As shown particularly in the end view of FIG. 6B and the cross-sectional view of FIG. 8, the main body 80 of the tool terminal block 76 includes a plurality of window frames 98 which each define a window or opening 100 for receiving and guiding one of the blade terminals 62. The female terminals 88 and 92 of the tool terminal block 76 are disposed within adjacent ones of the window frames 98. The window frames 98 are generally U-shaped and each include a pair of longitudinally extending legs 102 connected by an intermediate segment 103. Openings 104 are provided between adjacent window frames 98 for receiving the insulating portions 74. In the exemplary embodiment, the ends of each of the legs 102 of the frames 98 are generally triangular in shape so as to define lead-in surfaces for the insulating portions 74 into the openings 104 and also for the terminal blades 62 into their respective opening 100.

As shown most clearly in FIG. 6B, the main body portion 80 of the tool terminal block 76 includes a pair of laterally spaced rails 97. The main body portion 80 further includes a pair of apertures 101 which receive the male terminals 86 and 90. The rails 97 are adapted to be received within grooves 99 provided in the housing 30 of the battery pack 16 immediately below the guide rails 52. As will be further discussed below, the laterally spaced rails 97 establish a tight fit with the grooves 99 for precisely aligning the tool terminal block 76 with the battery pack terminal block 26.

Figure 12:
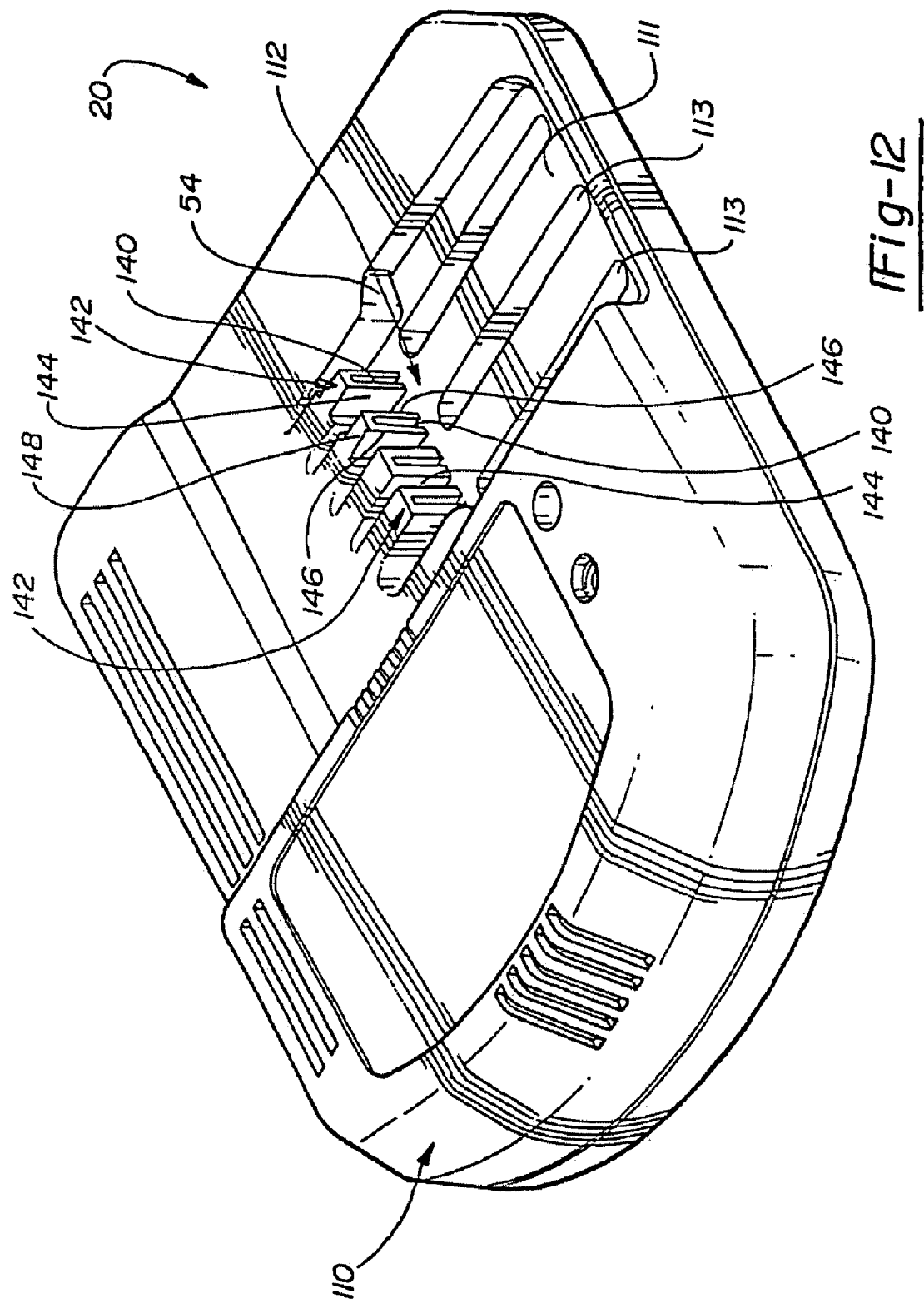
FIG. 12 is a perspective view of a battery pack charger of FIG. 11.

With specific reference to FIG. 11, a partially cutaway view of the battery charger 20 of the system of the present invention is shown operatively associated with a battery pack 16 partially removed for purposes of illustration. FIG. 12 is an elevated perspective view of the charger 20 shown with the battery pack 16 removed. In the preferred embodiment, the battery charger 20 is a non-isolated charger. As used herein, the term non-isolated will be understood to mean that the output voltage is not isolated from the mains input voltage. The battery charger 20 includes a housing 110 including an open recessed deck 111. The battery charger housing 110 further includes a rear coupling section 112 for mechanically engaging the upper portion 34 of the battery pack housing 22.

The rear coupling section 112 includes a pair of opposed grooves 54 similar to that provided in the tool housing 56 which receive the guide rails 52 of the battery pack 22. The battery charger 20 further includes a set of female terminals having at least a pair of female terminals 114 for receiving the positive and negative blade terminals 62 of the battery terminal pack 26. An electrical cord 116 provides AC electricity (for example, 120 volt electricity) to the battery charger 20. Adjacent positioning of the positive and negative terminal blades 62 permits a circuit layout of the charger which reduces electromagnetic interference.

The battery charger housing 110 is shown most clearly in FIG. 12 to define a plurality of blade terminal openings 140 corresponding in number to the blade terminals 62 of the battery pack 16. The blade terminal openings 140 are defined by insulating portions 142 adapted to cooperatively receive the insulating portions 74 of the battery pack 16. In this regard, adjacent insulating portions 142 are spaced apart to define openings 144 for receiving the insulating portions 74. The insulating portions 142 of the charger housing 110 each include a pair of vertically oriented sidewalls 146 and a horizontally oriented upper segment 148. The upper segments 148 function to conceal the terminals 114 from incidental contact or damage. Since the blade terminals 62 of the battery pack 16 are vertically spaced from the floor 64, the upper segments 148 can be accommodated therebetween. It will be understood by those skilled in the art that the remainder of the battery charger 20 is conventional in construction insofar as the present invention is concerned.

The battery pack 16 is loaded into the charger 20 by first vertically positioning the pack 16 on the deck 111 and then sliding the pack 16 rearward to engage the rails 52 of the pack 16 with the grooves 54 of the charger 20. While on the deck 111, the pack 16 is supported by ribs 113. The open deck 111 facilitates location of the pack 16 in the charger 20 since the pack 16 is first grossly aligned with the charger 20 through placement on the deck 111 and then mechanically and electrically connected through a rearward sliding action. A mechanical interface of improved stability is provided. In the event a user lifts the pack 16 and charger 20 by gripping the pack 16 only, the engaged rails 52 and grooves 54 avoid potentially damaging loads on the electrical terminals. Thus, the combination of the loading deck 111 and the rear coupling section 112 provides improved loading ergonomics and mechanical stability of the connection.

Turning now to FIG. 13, the converter 18 of the system of the present invention is illustrated operatively attached to the reciprocating saw 12. Again, it will be appreciated by that the particular tool 12 shown in FIG. 12 is merely exemplary. In this regard, the converter 18 is operative for use with the circular saw 10 shown in FIG. 1, the drill 14 shown in FIG. 15, or any other tool similar constructed in accordance with the teachings of the present invention. The converter 18 of FIG. 13 is specifically adapted for converting main voltage AC electricity to 24 volt DC electricity.

In the preferred embodiment, the converter 18 is a non-isolated converter and includes a housing 120 and an electrical power cord 122. The housing 120 is substantially similar to the housing 22 of the battery pack 16. In this regard, the housing 120 includes first and second clam shell halves joined at a longitudinally extending parting line. Alternatively, the housing 120 may include three (3) or more pieces. An upper portion 122 of the housing 120 includes a pair of guide rails 124 similar to those of the battery pack 16.

Figure 14:
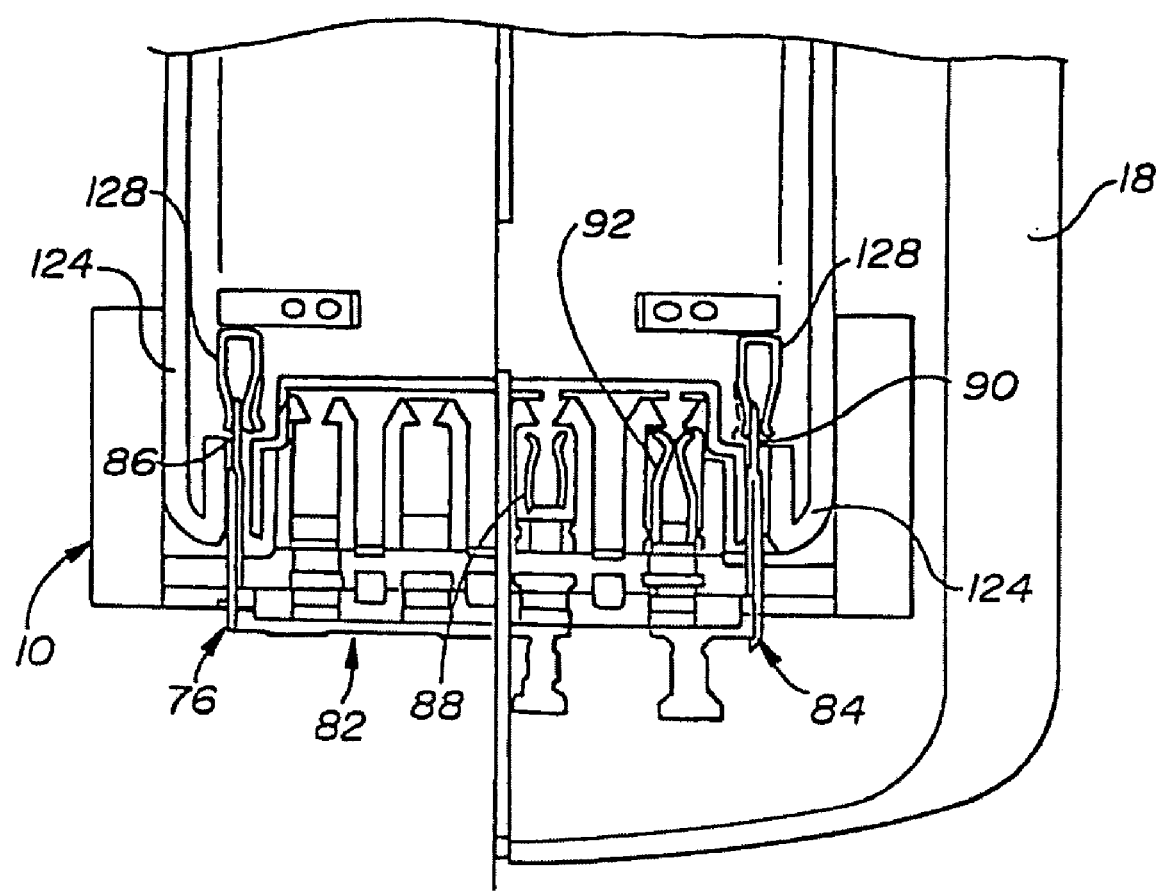
FIG. 14 is a cross-sectional view illustrating the interface between the cordless power tool and the converter.

With continued reference to FIG. 13 and additional reference to FIG. 14, the converter 18 is shown to include a pair of female terminals 128 adapted to receive the male terminals 86 and 90 of the tool terminal block 76. The female terminals 128 are recessed within the upper portion 122 of the housing 120 of the converter 18. In the preferred embodiment, the female terminals 128 are recessed within the housing 120 so of the converter 18 approximately 8 mm or more. AC power is converted to DC power by the converter 18 and delivered to the tool 12 through the terminals 128. When the converter 18 is operatively installed on the tool 12, the female terminals 88 and 92 of the tool terminal block 76 are electrically inoperative.

Figure 16:
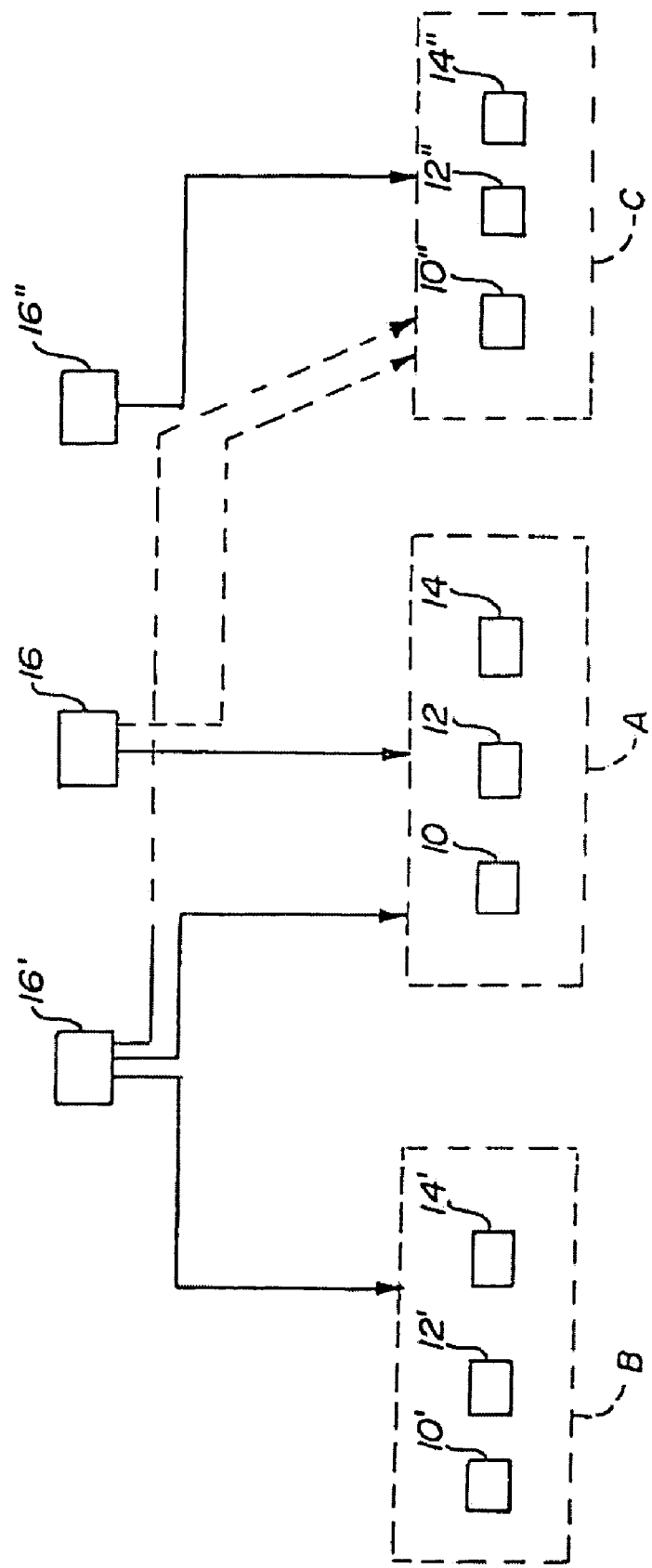
FIG. 16 is a schematic representation illustrating the compatibility of the various batteries and tools of the present invention.

As discussed above, the exemplary tools 10-14 shown throughout the drawings are specifically designed to operate on 24 volt DC electricity. With reference to the schematic illustration of FIG. 16, the system of the present invention is shown to further include second and third lines B and C of cordless power tools specifically intended for operation at alternate voltages. With the exception of their motors, the second and third lines B and C of power tools are substantially identical to the tools 10-14 of the first line A. For purposes of identification, the tools of the second and third lines B and C are denoted in the drawings with common reference numerals which are primed and double-primed, respectively. It will be understood that the tools 10'-14' and 10"-14" are powered by second and third voltages, respectively. In the exemplary embodiment, the second and third voltages are lower and higher than the first voltage, respectively. The multiple lines A-C of tools operatively driven by different voltage values provide a consumer with a wide range of selection to accommodate particular power requirements.

Figure 9:
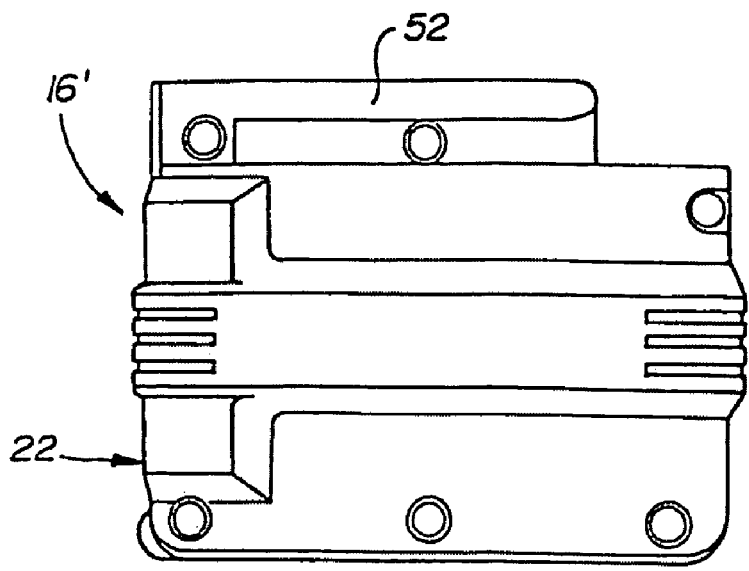
FIG. 9 is a right side view of a second battery pack for the cordless power tool system of the present invention.
Figure 10:
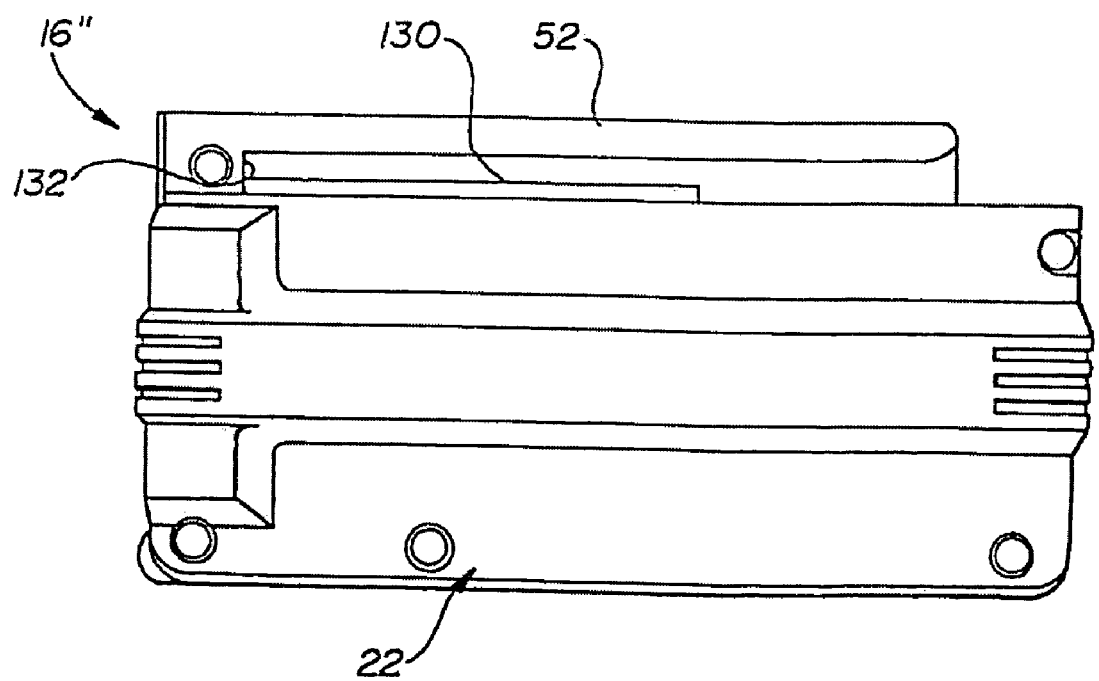
FIG. 10 is a right side view of a third battery pack of the cordless power tool system of the present invention.

As shown in FIGS. 9 and 10, the system of the present invention is illustrated to include second and third battery packs 16' and 16" for providing electricity at the second and third voltages, respectively. The second and third battery packs 16' and 16" are substantially identical in construction to the first battery pack 16. For this reason, reference numerals introduced above with respect to the first battery pack 16 will be used to identify common elements of the second and third battery packs 16' and 16".

The third battery pack 16" differs from the first battery pack 16 in that its housing 22 is substantially longer in a longitudinal direction so as to accommodate additional battery cells.

In the exemplary embodiment, the width and height dimensions of the third battery pack 16" are identical to corresponding dimensions of the first battery pack 16. The rails 52 of the third battery pack 16" are correspondingly longer as are the grooves 54 formed in the housings 56 of the tools 10"-14" of the third line.

The system of the present invention is intended to prevent operative engagement of any battery pack (e.g., 16 or 16") with a lower voltage value tool so as to protect the electric motors from damage. For example, the higher voltage third battery pack 16" is intended to be locked out of both the tools 10-14 of the first line A and the tools 10'-14' of the second line B. In this regard, the housing 22 of the third battery pack 16" is shown to include a lock-out rib 130. In the embodiment illustrated, the rib 130 extends approximately 86 millimeters from a datum wall 132 and is approximately two millimeters in height and two millimeters in width. The datum wall 132 normally limits translation of the rails 52 relative to the grooves 54. An appropriate stop surface 133 will engage the rib 130 and prevent engagement of the third battery pack 16" which has a higher voltage with the terminal blocks 76 of the tools of the first and second lines A and B.

With particular reference to FIG. 5, the first battery pack 16 is designed to be locked out of the lower voltage tools 10'-14' of the second line B and will not be long enough to engage the terminal block of the third line C. The first battery pack 16 has a lockout rib 134 which extends approximately 14 millimeters from the datum wall 132. Again, the lockout rib 134 is approximately two millimeters in height and two millimeters in width. While not specifically shown, it will be understood that the grooves 54 of the tools 10-14 of the first line A are formed to accept the lockout rib 134 while the grooves of the tools of the lower voltage second line B are not.

With specific reference to FIG. 9 illustrating the second battery pack 16', it will be understood that the second battery pack 16' is not specifically intended to be mechanically locked out of any of the tools of any of the lines A-C. However, the length of the battery pack 16', which in the preferred embodiment is identical to that of the first battery pack 16, is insufficient to engage the tool terminal block of the third line C of tools. The battery pack 16' is adapted to work in both the first and second tools lines A and B. In the alternative arrangement discussed above in which the higher voltage third battery pack 16" has a length identical to that of the first and second battery packs 16 and 16', the low voltage second battery pack 16' would not need to be locked out of the tools of the higher voltage tool line C. However, sufficient power may not be available for intended usages. The dashed line between the battery packs 16 and 16' and the tools of the third line C shown in FIG. 16 indicates this alternative where electrical engagement is not prevented.

Attachment of the battery pack 16 to the housing 56 automatically aligns or centers the blade terminals 62 of the battery pack 16 with the female terminals 88 and 92 of the tool terminal block 76. When the battery pack 16 is inserted into the tool housing 56 the alignment of pack terminal blades 62 and the female tool terminals 88 and 92 occurs in two stages. In a first stage, the guide rails 52 are loosely engaged in the mating tool grooves 54. The total travel of the battery pack 16 relative to the housing 56 is approximately 60 mm. In the second stage, which occurs during approximately the last 22 mm of travel of the pack 16 relative to the housing 56, the grooves 99 in the housing 30 of the battery pack 16 engage the rails 97 of the tool terminal block 76 in a tight fit. In the preferred embodiment, the housing 30 and the alignment rails 97 are in a snug fit. This engagement precisely aligns the battery pack 16 with the tool terminal block 76 and in turn aligns the pack terminal block 26 with the tool terminal block 76. Normally, the blade terminals 62 of the pack 16 will engage the female tool terminals 88 and 92 without further alignment. If the terminal blades 62 are bent, then the terminal blade 62 may engage an associated window frame 98 of the tool terminal block 76. The tapered legs 102 of the frame 98 may aid in straightening a slightly bent terminal blade 62. If the terminal blade 62 is severely bent, entry of the terminal blade 62 into the opening 100 is prevented by the frame 98.

Figure 2:
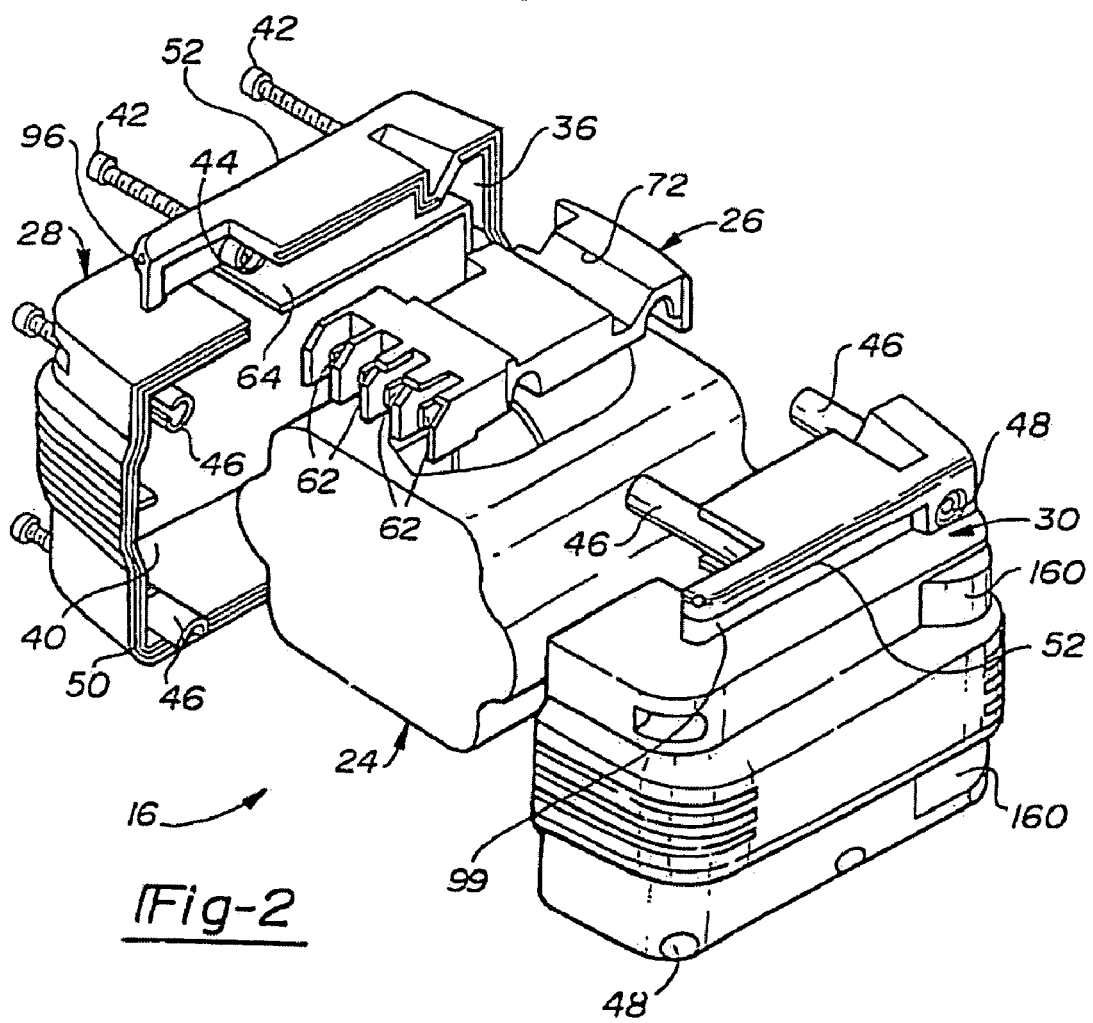
FIG. 2 is an enlarged and exploded perspective view of a first battery pack of the cordless power tool system which is shown in FIG. 1A.

As noted above, it may be alternatively desirable to permit the tool terminal block 76 to longitudinally slide in the tool housing 56. When the pack terminal blades 62 are inserted in the female tool terminals 88 and 92 in such an arrangement, the pack terminal blades 62 engage the female tool terminals 88 and 92 and slightly translate the tool terminal block 76 rearwardly. For example, such translation may be on the order of approximately 2 mm. When the tool terminal block 76 reaches its limit of travel relative to the tool housing 56, the pack terminals blades 62 are inserted between the female tool terminals 88 and 92. Then, the pack blade terminals 62 are firmly gripped between the female tool terminals 88 and 92. If the battery pack 16 moves relative to the tool housing 56 due to vibration of the tool 10 along an axis parallel to the guide rails 52, the pack 16 and the tool terminal block 76 move together. This conjoint movement of the tool terminal block 76 and the pack 16 may reduce wear on the pack terminal blades 62 and female tool terminals 88 and 92. With particular reference to FIG. 2, the battery pack 16 of the present invention is shown to include protrusions 160 to facilitate extraction of the battery pack 16 from the tool housing 56 or from the charger 20. In the exemplary embodiment, each of the housing halves 28 and 30 includes a pair of vertically spaced protrusions 160 disposed on a lateral side of the housing 22 adjacent a rear side of the housing 22. Each protrusion 160 is illustrated to be convexly curved and have a forward portion which the user may directly engage with a thumb or index finger. For example, the width of the battery pack 16 permits the user to engage an upper protrusion 160 of the second housing half 30 with the right thumb and an upper protrusion 160 of the first housing half 28 with the right index finger. The lower protrusions 160 may be used in a substantially similar manner when the battery pack 16 is inverted in the charger 20.

Figure 17:
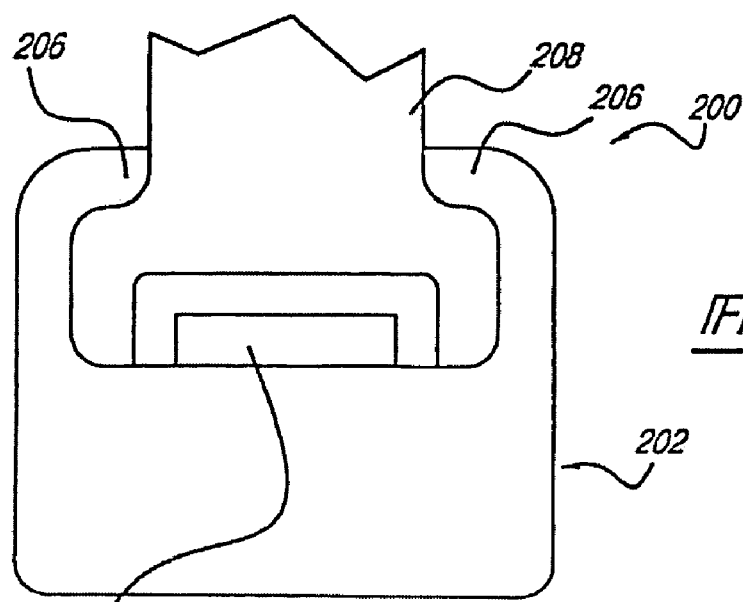
FIG. 17 is a simplified end view of a portion of a cordless power tool constructed in accordance with the teachings of a first alternative embodiment of the present invention.

Referring generally to FIGS. 17 through 26, various alternative embodiments of the present invention will be described. With particular reference to FIG. 17, a simplified rear end of a portion of a power tool 200 constructed in accordance with the teachings of a first alternative embodiment of the present invention is illustrated. As with the tools of the system 10 of the preferred embodiment of the present invention, the tool 200 includes a rechargeable battery pack 202 having a battery pack terminal block 204. The battery pack terminal block 204, which is substantially identical to battery pack terminal block 26 described above, interfaces with a tool terminal block (not specifically shown) substantially identical to tool terminal block 76 described above. The rechargeable battery pack is formed to include a pair of inwardly extending rails 206 which slidably engage a corresponding pair of engagement portions 207 of a housing 208 of the tool 200. In the embodiment illustrated, the engagement portions 207 are outwardly stepped portions of the housing 208.

Figure 18:
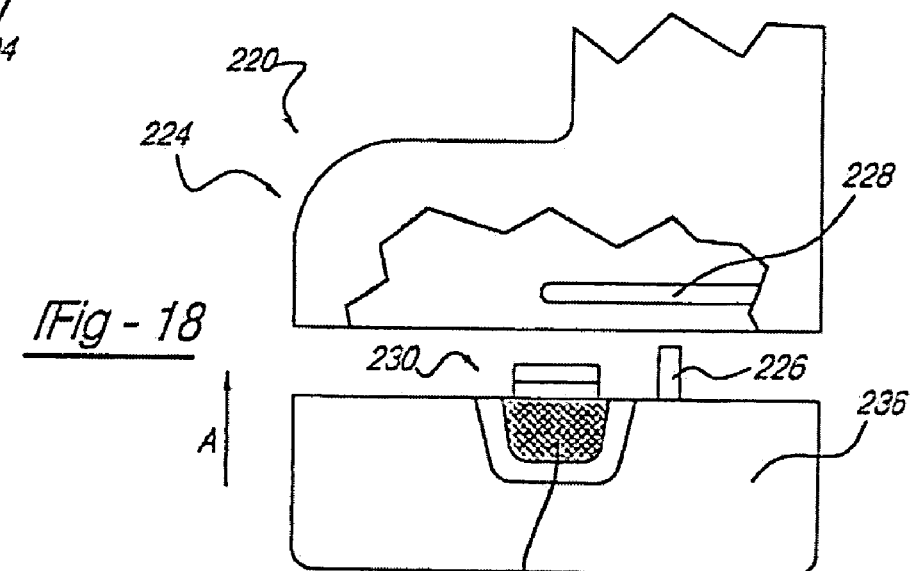
FIG. 18 is a partially exploded side view of a portion of a cordless power tool constructed in accordance with the teachings of a second alternative embodiment of the present invention shown cut away.
Figure 19:
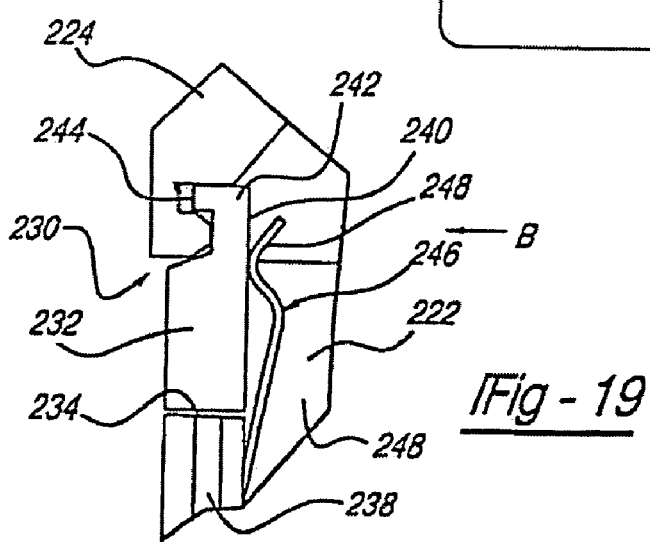
FIG. 19 is a simplified cross-sectional view illustrating the latch of FIG. 18.

With particular reference to the simplified and partially exploded view of FIG. 18 and the cross-sectional view of FIG. 19, a tool 220 constructed in accordance with a second alternative embodiment of the present invention is illustrated. In this embodiment, the tool 220 includes a rechargeable battery pack 222 which does not slide into a housing of the tool 224 in the manner discussed with the tools of the system 10 described above, but rather engages the housing 224 in the direction of arrow A. The rechargeable battery pack 222 carries at least one terminal 226 which engages a corresponding number of terminals 228 carried by the housing 224. In one application, the terminal 226 carried by the rechargeable battery 222 is a male terminal and the terminal 228 carried by the housing 224 is a female terminal.

The rechargeable battery pack 222 includes a pair of latch mechanisms 230, one of which is illustrated in FIGS. 18 and 19. It will be understood that a substantially identical latch mechanism 230 is incorporated on the opposing lateral side of the rechargeable battery pack 222 which is not shown. The latch mechanism 230 includes a button portion 232 which extends through an opening 234 defined in a housing 236 of the rechargeable battery pack 222. In one application, the latching mechanism 230 is unitarily constructed of plastic or other suitable material and is connected to a lower portion of the housing 236 through a cantilevered portion 238. An upper portion 240 of the latching mechanism 230 includes an outwardly extending flange 242 which engages a longitudinally extending groove 244 formed in the housing 224 in a manner substantially described above with respect to the tools of the system 10. A spring member 246 biases the latching mechanism 230 outward in the direction of arrow B. As most particularly shown in FIG. 19, an upper end 248 of the spring 246 engages the latching mechanism 230 and a lower end 250 is interconnected to a lower portion of the housing 236 of the rechargeable battery pack 232 in any conventional manner.

In operation, the buttons 232 of the latching mechanisms 230 are simultaneously inwardly depressed against the bias of the springs 246 such that the rechargeable battery pack 222 can be attached to or removed from the housing 224. While not illustrated, it will be understood by those skilled in the art that the latching mechanism 230 may incorporate appropriate lead-in surfaces such that advancement of the rechargeable battery pack 222 in the direction of arrow A inwardly forces the latching mechanisms 230 against the bias of the springs 246.

Figure 20:
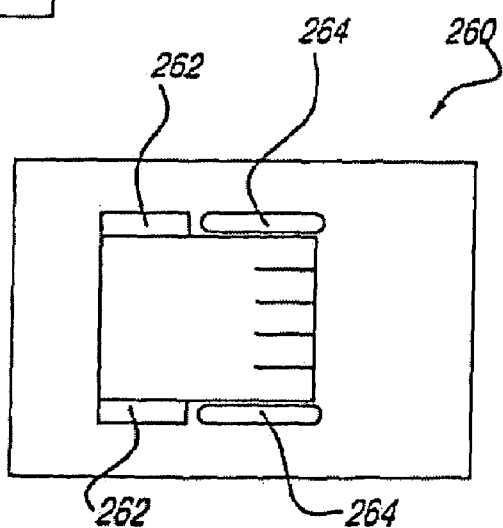
FIG. 20 is a top view of a battery pack of a third alternative embodiment of the present invention.

With particular reference to FIG. 20, a top view of a rechargeable battery pack 260 for use with a third alternative embodiment of the present invention is illustrated. While not illustrated in great detail, it will be understood that the rechargeable battery pack 260 includes a pair of laterally spaced guide rails 262 which are shorter but otherwise similar in construction to the guide rails 52 discussed above. As with the embodiment described above, the guide rails 262 are slidably received into cooperating grooves 54 defined by rails 55 formed in a housing 56 of the tool 10. Distinct from the embodiment discussed above, the rechargeable battery pack 260 includes a pair of female terminals 264 which cooperate with the male terminals 86 and 90 of the tool terminal block 76. The female terminals 264 are each aligned with one of the grooves defined by the laterally spaced guide rails 262.

Figure 21:
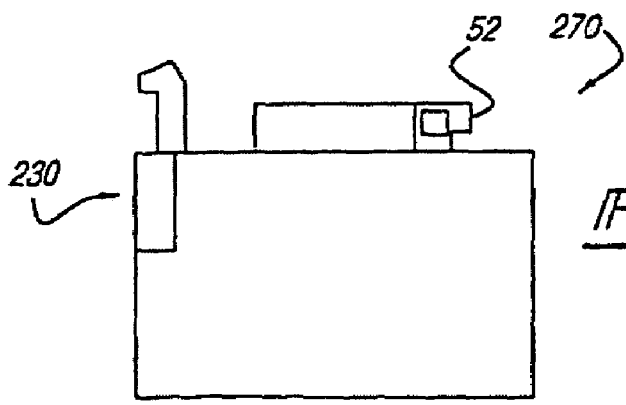
FIG. 21 is a front side view of a battery pack of a fourth alternative embodiment of the present invention.

With particular reference to the simplified front side view of FIG. 21, a rechargeable battery pack 270 for use with a fourth alternative embodiment of the present invention in illustrated. The rechargeable battery pack 270 is similar to the rechargeable battery pack of the second alternative embodiment discussed above. However, the rechargeable battery pack 270 includes a single latching mechanism 230. On the side opposite the latching mechanism 230, the rechargeable battery pack 270 includes a longitudinally extending rail 52 substantially identical to the similarly identified element described above. A portion of a tool housing is shown in hidden lines and includes inwardly extending rails 274 and 276.

Figure 22:
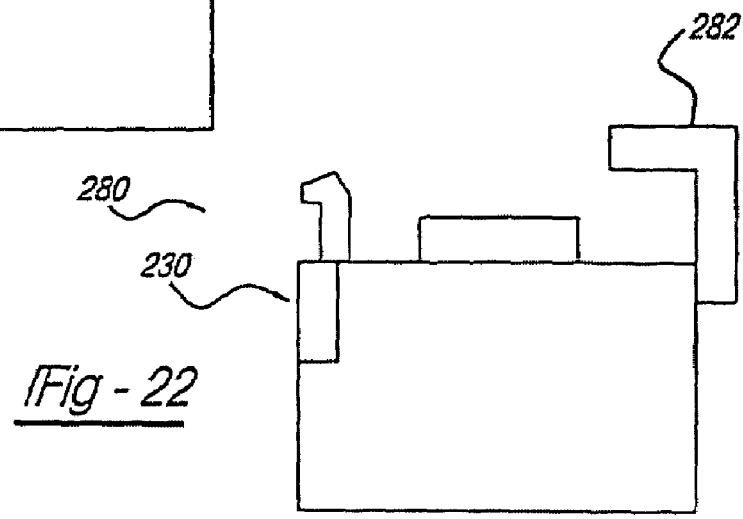
FIG. 22 is a front side view of a battery pack of a fifth alternative embodiment of the present invention.

With particular reference to FIG. 22, a front view similar to FIG. 21 of a rechargeable battery pack 280 for use with a fifth alternative embodiment of the present invention is shown. Again, the battery pack 280 includes a single latching mechanism 230 substantially identical to that discussed above. In this embodiment, on the opposite side of the latching mechanism 230, the rechargeable battery pack 280 is illustrated to include a rail 282 which cooperates with the housing 284 (shown in hidden lines) of the tool in a manner substantially discussed above with respect to the tool 200 of FIG. 17.

Figure 23:
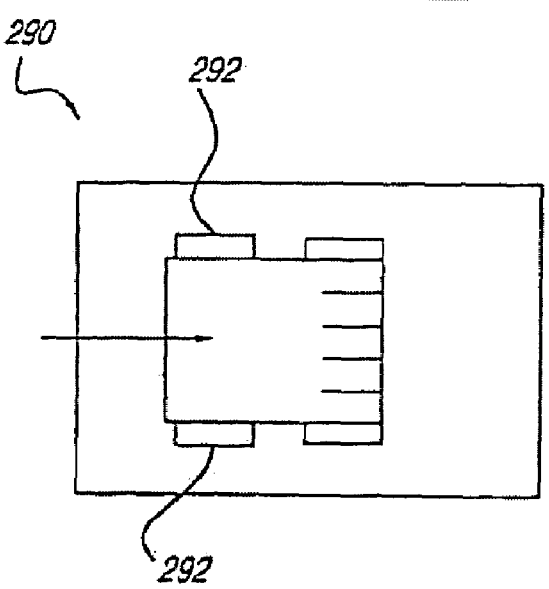
FIG. 23 is a top view of a battery pack of a sixth alternative embodiment of the present invention.

With particular reference to FIG. 23, a top view of a rechargeable battery pack 290 for use in a sixth alternative embodiment of the present invention is illustrated. The battery pack 290 is intended to cooperate with the tools of the system 10 described above. In this embodiment, the rechargeable battery pack includes a pair of longitudinally extending rails 292 which are substantially identical, albeit shorter, in construction to the rails described above and referenced at number 52. The shortened length of the rails accommodates the male terminals 86 and 90, where present.

With particular reference now to FIG. 24, a top view of a rechargeable battery pack 300 is illustrated for use in a seventh alternative embodiment of the present invention. The rechargeable battery pack includes a housing 302 which is similar in construction to the housing 22 described above with respect to the system 10 of the present invention and is adapted to cooperatively engage the tools of the system 10. A battery pack terminal block 304 upwardly extends from an upper surface 306 of the housing 302 and engages the tool terminal block 80. In this embodiment, the rechargeable battery pack 300 does not include longitudinal rails such as those identified above at reference numeral 52, but rather includes a locking mechanism 308 for engaging the grooves 54 defined by the rails 55. The locking mechanism 308 includes a rotatable member 310 mounted to the top 306 of the housing 302 for rotation about a vertically extending pivot axis 312. The rotatable member 310 is illustrated to include a pair of rail locking protrusions 314 positioned on an opposite side of the pivot axis 312. The rotatable member 310 further includes a manually operated handle 316.

The locking mechanism 308 is rotatable between an unlocked position in which the rechargeable battery pack 300 can be moved relative to the housing and a locked position in which the rail locking protrusions 314 engage the grooves 55. The unlocked position is shown in solid lines in FIG. 24. The locked position is shown in hidden lines. It will be understood that the locking protrusions 314 may be formed to include camming portions at their distal ends (shown in phantom) so as to increase the locking force applied to the grooves 55.

With particular reference to FIGS. 25 and 26, a portion of a battery pack 320 form use with an eighth alternative embodiment of the present invention is illustrated. In this embodiment, a tab 322 is rotatably attached to a housing 324 of the rechargeable battery pack 320 for rotation about a pivot axis 326. A pair of locking portions 330 are pivotally interconnected to the housing 324 for rotation about vertically extending pivots 332. The tab 322 includes a camming portion 334 that on rotation pushes the locking portions 330 from unlocked position to locked positions. The unlocked positions are shown in solid lines. The locked positions are shown in hidden lines. In the locked positions, the locking portions 330 engage the grooves 55 of the tools of the system 10. In operation, as the rechargeable battery pack 320 is inserted into the housing of the power tool, the power tool housing forces the tab 322 to rotate downwardly (as shown in FIG. 26), thereby locking the rechargeable battery pack 320 to the housing.

With particular reference to FIG. 27, a top view of a rechargeable battery 340 for use with a ninth alternative embodiment of the present invention is illustrated. As with the rechargeable battery pack 16 as described above, the rechargeable battery pack includes a terminal block 342 which engages a tool terminal block of a tool. The rechargeable battery pack 340 includes a locking arrangement for 344 for releasably engaging the grooves 55 of the tools of the system 10. A pinion gear 346 is attached to a top surface 348 of a housing 350 of the rechargeable battery pack 340. The pinion gear 346 is rotatable about a vertically extending axis 352. The pinion gear 346 meshingly engages a pair of rack members 354. The locking arrangement 344 further includes a rod 356 with a first end 358 meshingly engaging the pinion gear and a second end including a manually rotatable handle member 360. Rotation of the handle member 360 in a first direction causes rotation of the pinion gear 346 in a clockwise direction (as shown in FIG. 27) which in turn causes a rear one of the rack members to move in the direction of arrow C and a forward one of the rack members 354 to move in direction of arrow D. In this manner, the distal ends of the rack members 354 engage the grooves 55 and thereby lock the rechargeable battery pack 340 to the housing of the tool. Conversely, rotation of the handle member 360 in the opposite direction causes counterclockwise rotation of the pinion gear 346 and resultantly draws the rack members 354 inwardly to thereby release the rechargeable battery pack 340 from the housing of the tool.

With particular reference to FIG. 28, a top view of a battery pack 370 for use in a tenth alternative embodiment of the present invention is illustrated. In this embodiment, the rechargeable battery pack 370 is again intended to engage the housings of the tools of the system 10. The rechargeable battery pack 370 includes a battery pack terminal block 372 which engages the tool terminal block. The rechargeable battery pack 370 further includes a pair of locking members 374 for engaging the grooves 55 of the tools of the system 10. In the embodiment illustrated, the locking members 374 are spring elements which each include a forward end 376 secured to a top side of a housing 378 of the rechargeable battery pack 370. As illustrated, the spring elements 374 are formed to include mounting portions 380 which are attached to the housing 378 through threaded fasteners or the like. A central portion 384 of each of the spring elements outwardly extends to engage an associated one of the grooves 55. A rear or free end 386 of each of the spring elements preferably extends beyond the housing 378. In operation, the spring elements 374 are resiliently biased to engage the grooves 55. The ends 386 of the spring elements 374 can be manually grasped and squeezed together to inwardly contract the central portions 384 and thereby allow removal of the rechargeable battery pack 370 from the tool housing.

With particular reference to FIG. 29, a top view of a rechargeable battery pack 400 for use with an eleventh alternative embodiment of the present invention is illustrated. In this embodiment, the rechargeable battery pack 400 is similar to the rechargeable battery pack 16 discussed above and is intended for use with the system 10. Distinct from the rechargeable battery pack 16, the rechargeable battery pack 400 includes a pair of longitudinally extending rails 402 configured to outwardly and inelastically bend the pair of male terminals 86 and 90 upon engagement of the battery pack 400 with the tool 10. In the embodiment illustrated, the rails 402 include forward ramped surfaces 404 intended to engage and deflect the male terminals 86 and 90. The inelastic bending of the male terminals 86 and 90 renders the male terminals 86 and 90 inoperative for future use.

While the invention has been described in the specification and illustrated in the drawings with reference to various embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A system of cordless tools comprising:
    a cordless power tool having a housing with a motor housing portion, a handle and a battery connection portion, the handle having a first end, which is coupled to the motor housing portion, and a second end that is coupled to the battery connection portion, the handle being disposed between the motor housing portion and the battery connection portion, the battery connection portion being spaced apart from the motor housing portion and having a pair of tool guide grooves, a pair of tool guide rails, and a plurality of tool terminals; and
    a battery pack having a battery housing, a battery that is received in the battery housing and a plurality of battery terminals that are electrically coupled to the battery, the battery housing including a pair of battery guide rails, a pair of battery guide grooves, and a pair of flat portions that are disposed laterally outwardly of the battery guide rails and generally parallel to the battery guide rails;
    wherein the battery pack engages the battery connection portion such that the battery guide rails are received in the tool guide grooves and the tool guide rails are received in the battery guide grooves;
    wherein one of the tool terminals and the battery terminals is a male blade terminal and the other one of the tool terminals and the battery terminals is a female terminal that receives an associated one of the male blade terminals when the battery pack is fixedly but releasably coupled to the battery connection portion; and
    wherein flat portions of the battery housing abut a surface of the battery connection portion to grossly align the battery pack and the battery connection portion.

2. The system of cordless tools of claim 1, wherein the tool terminals are coupled to a tool terminal block, the tool terminal block having a keying feature, and wherein the battery terminals are coupled to a battery terminal block, the battery terminal block having a mating keying feature that receives the keying feature on the tool terminal block when the battery pack is fixedly but releasably coupled to the battery connection portion.

3. The system of cordless power tools of claim 2, wherein one of the keying feature and mating keying feature is a projection that is slidably received into the other one of the keying feature and mating keying feature when the battery pack is fixedly but releasably coupled to the battery connection portion.

4. The system of cordless tools of claim 2, wherein the tool terminal block is fixedly coupled to the battery connection portion.

5. The system of cordless tools of claim 4, wherein the battery pack includes a battery housing and the battery terminal block is fixedly coupled to the battery housing.

6. The system of cordless tools of claim 2, wherein the battery pack includes a battery housing and the battery terminal block is fixedly coupled to the battery housing.

7. The system of cordless power tools of claim 2, wherein one of the battery pack and the tool housing further comprises a latch, the latch being configured to engage a recess formed in the other one of the battery pack and the tool housing to inhibit removal of the battery pack from the battery connection portion.

8. The system of cordless power tools of claim 2, wherein the tool terminal block is movable relative to the handle.

9. A system of cordless tools comprising:
a cordless power tool having a tool housing with a motor housing portion, a handle and a battery connection portion, the handle having a first end, which is coupled to the motor housing portion, and a second end that is coupled to the battery connection portion, the handle being disposed between the motor housing portion and the battery connection portion, the battery connection portion being spaced apart from the motor housing portion and having a pair of first sidewalls and a plurality of tool terminals that are disposed between the first sidewalls, each of the first sidewalls having an L-shaped interior surface; and
a battery pack having a battery housing and a plurality of battery terminals, the battery housing having a pair of second sidewalls, each of the second sidewalls slidably engaging an associated one of the first sidewalls when the battery pack is inserted to the battery connection portion in an insertion direction, the first and second sidewalls cooperating to limit movement of the battery pack relative to the battery connection portion in two directions that are perpendicular to the insertion direction;
wherein one of the tool terminals and the battery terminals is a male blade terminal and the other one of the tool terminals and the battery terminals is a female terminal that receives an associated one of the male blade terminals when the battery pack is fixedly but releasably coupled to the battery connection portion; and
wherein the plurality of battery terminals include a positive terminal, a negative terminal and at least one data terminal that is configured to transmit a battery identification signal for identifying the battery pack.

10. The system of cordless tools of claim 9, wherein the tool terminals are coupled to a tool terminal block, the tool terminal block having a keying feature, and wherein the battery terminals are coupled to a battery terminal block, the battery terminal block having a mating keying feature that receives the keying feature on the tool terminal block when the battery pack is fixedly but releasably coupled to the battery connection portion.

11. The system of cordless power tools of claim 10, wherein one of the keying feature and mating keying feature is a projection that is slidably received into the other one of the keying feature and mating keying feature when the battery pack is fixedly but releasably coupled to the battery connection portion.

12. The system of cordless tools of claim 10, wherein the tool terminal block is fixedly coupled to the battery connection portion.

13. The system of cordless tools of claim 12, wherein the battery pack includes a battery housing and the battery terminal block is fixedly coupled to the battery housing.

14. The system of cordless tools of claim 10, wherein the battery pack includes a battery housing and the battery terminal block is fixedly coupled to the battery housing.

15. The system of cordless power tools of claim 10, wherein one of the battery pack and the tool housing further comprises a latch, the latch being configured to engage a recess formed in the other one of the battery pack and the tool housing to inhibit removal of the battery pack from the battery connection portion.

16. The system of cordless power tools of claim 10, wherein the tool terminal block is movable relative to the handle.

17. The system of cordless power tools of claim 9, further comprising a battery charger, the battery charger having a charger housing with a battery coupling portion, the battery coupling portion having a pair of third sidewalls, each of the third sidewalls having an L-shaped interior surface that is configured to slidably engage an associated one of the second sidewalls when the battery pack is inserted to the battery coupling portion in a charger insertion direction, the second and third sidewalls cooperating to limit movement of the battery pack relative to the battery coupling portion in two directions that are perpendicular to the charger insertion direction.

18. A method comprising:
providing a power tool having a tool housing, the tool housing including a motor housing, a handle, which extends from the motor housing, and a battery connection portion that is directly coupled to an end of the handle such that the handle is disposed between the motor housing and the battery connection portion, the battery connection portion being spaced apart from the motor housing portion and having a pair of first sidewalls and a plurality of first terminals, each of the first sidewalls having an L-shaped interior surface that defines a first guide rail;
providing a rechargeable battery pack having a battery housing, a battery received in the battery housing and a plurality of second terminals, that are electrically coupled to the battery, the battery housing including a pair of second sidewalls, each of the second sidewalls having a portion that is generally L-shaped and a flat portion that is disposed laterally outwardly of the generally L-shaped portion defining a second guide rail, the flat portion being generally parallel to the second guide rail;
grossly aligning the rechargeable battery pack to the power tool by placing the flat portions of the second sidewalls into contact with a lower surface of the first guide rail;
grossly aligning the first and second terminals by engaging the second sidewalls to the first sidewalls and sliding the battery pack relative to the power tool by a predetermined first distance; and
precisely aligning the first and second terminals by sliding the battery pack relative to the power tool by an additional predetermined second distance.

19. The method of claim 18, further comprising engaging the first and second terminals after the first and second terminals have been precisely aligned.

* * * * *

UNITED STATES PATENT AND TRADEMARK OFFICE
CERTIFICATE OF CORRECTION

PATENT NO. : 7,423,407 B2 Page 1 of 1
APPLICATION NO. : 11/330279
DATED : September 9, 2008
INVENTOR(S) : Watson et al.

It is certified that error appears in the above-identified patent and that said Letters Patent is hereby corrected as shown below:

Column 16,
Line 47, after "portion" insert -- , the generally L-shaped portion --.

Signed and Sealed this

Sixteenth Day of February, 2010

David J. Kappos
*Director of the United States Patent and Trademark Office*